United States Patent
Liu et al.

(10) Patent No.: US 10,217,190 B2
(45) Date of Patent: Feb. 26, 2019

(54) SYSTEM AND METHOD FOR RECONSTRUCTING HIGH-RESOLUTION POINT SPREAD FUNCTIONS FROM LOW-RESOLUTION INSPECTION IMAGES

(71) Applicant: KLA-Tencor Corporation, Milpitas, CA (US)

(72) Inventors: Helen Liu, Milpitas, CA (US); Rohit Patnaik, Milpitas, CA (US); Stephen Osborne, Omaha, NE (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/391,520

(22) Filed: Dec. 27, 2016

(65) Prior Publication Data
US 2018/0182067 A1    Jun. 28, 2018

(51) Int. Cl.
| | |
|---|---|
| G06K 9/32 | (2006.01) |
| G06T 3/40 | (2006.01) |
| G06T 5/20 | (2006.01) |
| G06T 5/50 | (2006.01) |

(52) U.S. Cl.
CPC ............. *G06T 3/4053* (2013.01); *G06T 5/20* (2013.01); *G06T 5/50* (2013.01)

(58) Field of Classification Search
CPC . G06T 2207/10061; G06T 2207/30148; G06T 7/0002; G06T 7/0004; G06T 3/4053; H01L 27/14687; H01L 27/14632
See application file for complete search history.

(56) References Cited

U.S. PATENT DOCUMENTS

| | | |
|---|---|---|
| 5,691,812 A | 11/1997 | Bates et al. |
| 5,805,278 A | 9/1998 | Danko |
| 6,621,570 B1 | 9/2003 | Danko |
| 6,760,100 B2 | 7/2004 | Ivakhnenko et al. |
| 7,092,082 B1 | 8/2006 | Dardzinski |
| 7,227,984 B2 | 6/2007 | Cavan |
| 7,539,584 B2 | 5/2009 | Bell et al. |
| 8,664,594 B1 | 3/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |
| 8,750,647 B2 | 6/2014 | Jesneck et al. |
| 8,830,464 B2 | 9/2014 | Feiler et al. |
| 9,055,233 B2 | 6/2015 | Venkataraman et al. |
| 9,091,666 B2 | 7/2015 | Cai et al. |

(Continued)

OTHER PUBLICATIONS https://en.wikipedia.org/wiki/Decimation_(signal_processing), Decimation (signal processing) from Wikipedia, Aug. 9, 2016, 4 pages.

(Continued)

*Primary Examiner* — Eueng-Nan Yeh
(74) *Attorney, Agent, or Firm* — Suiter Swantz PC LLO

(57) ABSTRACT

A method for reconstructing one or more high-resolution point spread functions (PSF) from one or more low-resolution images includes acquiring one or more low-resolution images of a wafer, aggregating the one or more low-resolution image patches, and estimating one or more subpixel shifts in the one or more low-resolution images and simultaneously reconstructing one or more high-resolution PSF from the aggregated one or more low-resolution image patches.

26 Claims, 50 Drawing Sheets

(56) References Cited

U.S. PATENT DOCUMENTS

| | | | |
|---|---|---|---|
| 9,111,366 B2 | 8/2015 | Enderlein | |
| 9,128,064 B2 | 9/2015 | Cavan et al. | |
| 9,165,341 B2 | 10/2015 | Evers-Senne et al. | |
| 9,294,690 B1 | 3/2016 | Caulfield | |
| 9,841,512 B2 | 12/2017 | Jiang et al. | |
| 2004/0036863 A1* | 2/2004 | Matsusita | G01N 21/956 356/237.2 |
| 2011/0268334 A1 | 11/2011 | Ra et al. | |
| 2011/0274342 A1 | 11/2011 | Maeda et al. | |
| 2012/0098950 A1* | 4/2012 | Zheng | G02B 21/06 348/79 |
| 2015/0048741 A1 | 2/2015 | Shortt et al. | |
| 2015/0057167 A1 | 2/2015 | Kaiser et al. | |
| 2015/0131893 A1* | 5/2015 | Sivaraman | G06T 7/0004 382/145 |
| 2015/0213623 A1 | 7/2015 | Sakumura et al. | |
| 2015/0333471 A1 | 11/2015 | Chimmalgi et al. | |
| 2015/0357179 A1 | 12/2015 | Wilson et al. | |
| 2016/0111247 A1 | 4/2016 | Potocek et al. | |
| 2016/0123897 A1 | 5/2016 | Pavani | |
| 2016/0267658 A1 | 9/2016 | Kleppe et al. | |

OTHER PUBLICATIONS https://en.wikipedia.org/wiki/Discrete-time_Fourier_transform, Discrete-time Fourier transform from Wikipedia, Aug. 27, 2016, 10 pages.
https://en.wikipedia.org/wiki/Integral, Integral from Wikipedia, Nov. 14, 2016, 21 pages.
https://en.wikipedia.org/wiki/Residual_sum_of_squares, Residual sum of squares from Wikipedia, Nov. 25, 2016, 2 pages.
Tekalp, A. Murat et al., "High-Resolution Image Reconstruction From Lower-Resolution Image Sequences and Space-Varying Image Restoration", IEEE, Sep. 1992, 0-7803-0532, pp. III-169-III-172.
International Search Report and Written Opinion dated May 3, 2018 for PCT/US2017/063750.
Takeda, Hiroyuki et al., "Super Drizzle: Applications of Adaptive Kernel Regression in Astronomical Imaging", The Advanced Maui Optical and Space Surveillance Technologies Conference, held in Wailea, Maui, Hawaii, Sep. 10-14, 2006, 15 pages.

* cited by examiner

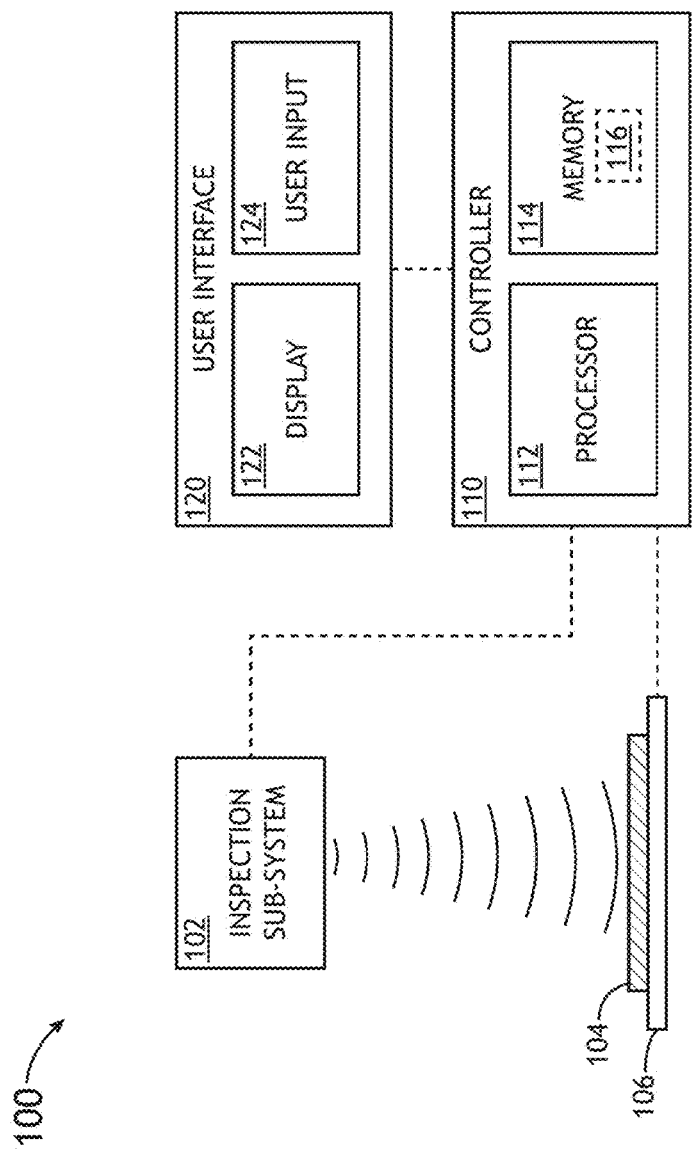

1700

1702 — ACQUIRE LOW RESOLUTION IMAGE PATCHES

1704 — AGGREGATE THE LOW-RESOLUTION IMAGE PATCHES

1706 — ESTIMATE ONE OR MORE SUB-PIXEL SHIFTS IN THE LOW-RESOLUTION IMAGE PATCHES AND SIMULTANEOUSLY RECONSTRUCT ONE OR MORE HIGH-RESOLUTION POINT SPREAD FUNCTIONS (PSF)

1708 — SELECT ONE OR MORE OPTICAL COMPONENTS OF THE INSPECTION SUB-SYSTEM

1710 — GENERATE ONE OR MORE ADDITIONAL METRICS OF THE ONE OR MORE OPTICAL COMPONENTS FOR CALIBRATION OF THE INSPECTION SUB-SYSTEM

1712 — PERFORM ONE OR MORE ADVANCED APPLICATIONS WITH THE ONE OR MORE RECONSTRUCTED HIGH-RESOLUTION PSF AND THE ONE OR MORE ADDITIONAL METRICS

FIG.17

SYSTEM AND METHOD FOR RECONSTRUCTING HIGH-RESOLUTION POINT SPREAD FUNCTIONS FROM LOW-RESOLUTION INSPECTION IMAGES

TECHNICAL FIELD

The present invention relates to wafer inspection and review, and, in particular, to reconstructing high-resolution point spread functions (PSF) from low-resolution wafer inspection images.

BACKGROUND

Fabricating semiconductor devices such as logic and memory devices typically includes processing a substrate such as a semiconductor wafer using a large number of semiconductor fabrication processes to form various features and multiple levels of the semiconductor devices. Multiple semiconductor devices may be fabricated in an arrangement on a single semiconductor wafer and then separated into individual semiconductor devices.

Semiconductor devices may develop defects during the fabrication processes. Inspection processes are performed at various steps during a semiconductor manufacturing process to detect defects on a specimen. Inspection processes are an important part of fabricating semiconductor devices such as integrated circuits, becoming even more important to successfully manufacture acceptable semiconductor devices as the dimensions of semiconductor devices decrease. For instance, detection of defects has become highly desirable as the dimensions of semiconductor devices decrease, as even relatively small defects may cause unwanted aberrations in the semiconductor devices.

Sensors in wafer inspection systems tend to undersample a defect shape if a point spread function (PSF) size is comparable or smaller than the pixel size of the sensor, resulting in a low-resolution image. Additionally, sensors in wafer inspection systems become saturated above a certain pixel intensity, providing no differentiation between features on the inspected wafer. As such, it would be desirable to provide a system and method that cures the shortcomings of the previous approaches as identified above.

SUMMARY

A system for reconstructing one or more high-resolution point spread functions (PSF) from one or more low-resolution image patches is disclosed, in accordance with one or more embodiments of the present disclosure. In one illustrative embodiment, the system includes an inspection sub-system. In another illustrative embodiment, the system includes a stage configured to secure one or more wafers. In another illustrative embodiment, the system includes a controller communicatively coupled to the inspection sub-system. In another illustrative embodiment, the controller includes one or more processors configured to execute a set of program instructions stored in memory. In another illustrative embodiment, the program instructions are configured to cause the one or more processors to acquire one or more low-resolution images of a wafer. In another illustrative embodiment, the one or more low-resolution images include one or more low-resolution image patches. In another illustrative embodiment, the one or more low-resolution image patches include one or more sub-pixel shifts. In another illustrative embodiment, the program instructions are configured to cause the one or more processors to aggregate the one or more low-resolution image patches. In another illustrative embodiment, the program instructions are configured to cause the one or more processors to estimate the one or more sub-pixel shifts and simultaneously reconstruct one or more high-resolution PSF from the aggregated one or more low-resolution image patches.

A method for reconstructing one or more high-resolution point spread functions (PSF) from one or more low-resolution image patches is disclosed, in accordance with one or more embodiments of the present disclosure. In one illustrative embodiment, the method includes acquiring one or more low-resolution images of a wafer. In another illustrative embodiment, the one or more low-resolution images include one or more low-resolution image patches. In another illustrative embodiment, the one or more low-resolution image patches include one or more sub-pixel shifts. In another illustrative embodiment, the method includes aggregating the one or more low-resolution image patches. In another illustrative embodiment, the method includes estimating the one or more sub-pixel shifts and simultaneously reconstructing one or more high-resolution PSF from the aggregated one or more low-resolution image patches.

It is to be understood that both the foregoing description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 1 illustrates a block diagram view of a system for imaging a sample, in accordance with one or more embodiments of the present disclosure.

FIG. 17 illustrates a flow diagram depicting a method of calibrating a wafer inspection system with one or more high-resolution reconstruction procedures, in accordance with one or more embodiments of the present disclosure.

DETAILED DESCRIPTION OF THE INVENTION

Figure 2A:
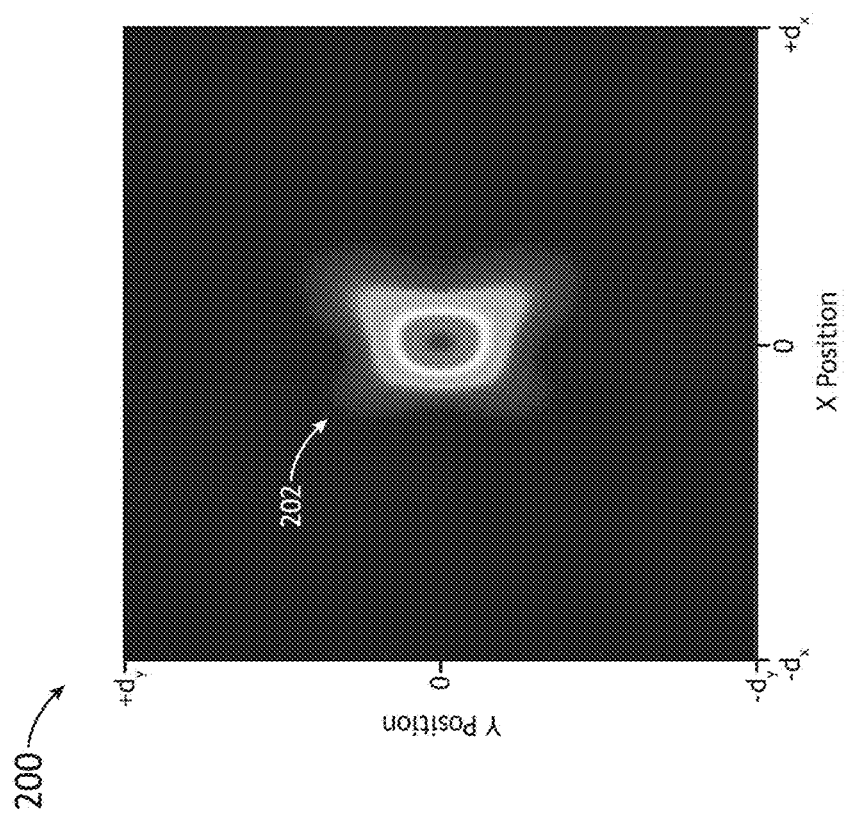
FIG. 2A illustrates graphical data of a modeled point spread function (PSF), in accordance with one or more embodiments of the present disclosure.

Reference will now be made in detail to the subject matter disclosed, which is illustrated in the accompanying drawings.

Referring to FIGS. 1 through 17, systems and methods for reconstructing one or more high-resolution point spread functions (PSF) from one or more low-resolution image patches are disclosed, in accordance with one or more embodiments of the present disclosure.

Inspection sub-systems may be characterized, in part, by a point spread function (PSF), which is a measurement of the response of the given inspection sub-system and, for the purposes of the present disclosure, is interpreted as being equivalent to the impulse response of the inspection sub-system. System impulse is one metric to define one or more of the focusing schemes, optimal filtering schemes, defect detection sensitivity, and/or defect sizing schemes of an inspection sub-system. For example, the sensitivity target of the inspection sub-system may include particles ranging from tens of—to twenties of—nanometers in diameter. The inspection sub-systems may, to a certain pixel size, achieve sufficient sampling to output at a desired resolution along the tangential imaging direction at all times. These inspection sub-systems may additionally achieve sufficient sampling to output at a desired resolution along the radial imaging direction at the expense of wafer throughput when so desired. Until the system reaches the certain pixel size, high-resolution data may be utilized to resolve two-dimensional system response during calibration and inspection. Below the certain pixel size, however, the images outputted by the inspection sub-systems begin to show a lack of clarity. In these inspection sub-systems, multiple layers of magnification may be implemented to image below the certain pixel size, to allow for a special "diagnosis" mode, but such solutions are prohibitive in terms of design complexity and cost (to manufacturer and/or consumer). Additionally, methods of reconstruction have required the imaging resolution to be much smaller with respect to the response function, severely limiting the practical use of reconstruction. As a result, the impulse response will be undersampled, resulting in issues for special use cases such as calibration and speckle/particle differentiation in some rough films.

Embodiments of the present disclosure are directed to reconstructing one or more low-resolution point spread functions (PSF) with one or more super resolution procedures (or functions) to generate one or more high-resolution PSF. Embodiments of the present disclosure are also directed to reconstructing one or more high-resolution PSF from one or more low-resolution image patches with one or more super resolution procedures. Embodiments of the present disclosure are also directed to including motion of the wafer inspection system in the one or more super resolution procedures. Embodiments of the present disclosure are also directed to performing system sensitivity analysis and calibration with the one or more super resolution procedures.

Additional embodiments of the present disclosure are directed to applying the one or more super resolution process to one or more advanced applications. For example, the one or more advanced applications may include suppressing image speckle. By way of another example, the one or more advanced applications may include separating cosmic ray-induced dark noise from real particles (i.e., one or more true defects). By way of another example, the one or more advanced applications may include extending the dynamic range of an inspection system.

Advantages of embodiments of the present disclosure include overcoming the pixel size limit of a sensor in a wafer inspection system. Advantages of embodiments of the present disclosure also include accurately reconstructing one or more high-resolution point spread functions (PSF) from one or more low-resolution wafer image patches in an under-sampling wafer inspection system. Advantages of embodiments of the present disclosure also include providing a low-cost alternative to methods of generating high-resolution images for a variety of applications. For example, the variety of applications may include one or more applications related to calibration and issue diagnosis of the inspection system. For instance, the variety of applications may include defining the best focusing scheme of the inspection sub-system using PSF measurements during calibration of the inspection system. Additionally, the variety of applications may include monitoring drift of the inspection sub-system over time. Further, the variety of applications may include troubleshooting inspection system sensitivity against a theoretical model.

By way of another example, the variety of applications may include one or more applications related to one or more of detection, classification, or sizing of one or more defects on an inspected wafer. For instance, the variety of applications may include one or more of enabling optimal filter bank design for particle sensitivity, differentiating speckle pattern from particle response to improve sensitivity for films, or resolving dense defect of interest (DOI) clusters during the detection of one or more defects. Additionally, the variety of applications may include deconvolving PSF to enhance classification of the one or more defects. Additionally, the variety of applications may include reducing reported particle sizing error and coupling the particle response with a scatter model for DOI to size one or more defects.

Advantages of embodiments of the present disclosure are also directed to implementation with one or more advanced applications such as decoupling a mixture of speckle and shot noise for films based on speckle pattern. Advantages of embodiments of the present disclosure are also directed to implementation with one or more advanced applications such as utilizing one or more super resolution procedures with low-resolution PSF to differentiate one or more true defects against cosmic ray noise. Advantages of embodiments of the present disclosure are also directed to implementation with one or more advanced applications such as extending the dynamic range of an inspection sub-system.

FIG. 1 illustrates a block diagram view of system 100 for sample inspection, in accordance with one or more embodiments of the present disclosure. In one embodiment, system 100 includes an inspection sub-system 102. In another embodiment, the system 100 includes a sample stage 106 for securing one or more samples 104. In another embodiment, the system 100 includes a controller 110. In another embodiment, the system 100 includes a user interface 120.

In another embodiment, the inspection sub-system 102 is configured to detect one or more defects of the sample 104. For example, the inspection sub-system 102 may include, but is not limited to, an electron beam inspection or review tool (e.g., a Scanning Electron Microscope (SEM) system). By way of another example, the inspection sub-system 102 may include, but is not limited to, an optical inspection sub-system. For instance, the optical inspection sub-system may include a broadband inspection sub-system including, but not limited to, a laser sustained plasma (LSP) based inspection sub-system. Additionally, the optical inspection sub-system may include a narrowband inspection sub-system, such as, but not limited to, a laser scanning inspection sub-system. Further, the optical inspection sub-system may include, but is not limited to, a brightfield imaging tool, or a darkfield imaging tool. It is noted herein that the inspection sub-system 102 may include any optical system configured to collect and analyze illumination reflected, scattered, diffracted, and/or radiated from a surface of a sample 104.

Examples of inspection sub-systems are described in U.S. Pat. No. 7,092,082, issued on Aug. 8, 2006; U.S. Pat. No. 6,621,570 issued on Sep. 16, 2003; and U.S. Pat. No. 5,805,278 issued on Sep. 9, 1998, which are each herein incorporated by reference in the entirety. Example of inspection sub-systems are also described in U.S. Pat. No. 8,664,594, issued on Apr. 4, 2014; U.S. Pat. No. 8,692,204, issued on Apr. 8, 2014; U.S. Pat. No. 8,698,093, issued on Apr. 15, 2014; U.S. Pat. No. 8,716,662, issued on May 6, 2014; U.S. patent application Ser. No. 14/699,781, filed on Apr. 29, 2015; U.S. patent application Ser. No. 14/667,235, filed on Mar. 24, 2015; and U.S. patent application Ser. No. 14/459,155, filed on Aug. 13, 2014, which are each herein incorporated by reference in the entirety.

For purposes of the present disclosure, a defect may be classified as a void, short, particle, residue, scum, or any other defect known in the art.

In another embodiment, although not shown, the inspection sub-system 102 may include an illumination source, a detector and various optical components for performing inspection (e.g., lenses, beam splitters and the like). For example, the inspection sub-system 102 may include any illumination source known in the art. For instance, the illumination source may include, but is not limited to, a broadband light source or a narrowband light source. In addition, the illumination source may be configured to direct light to the surface of the sample 104 (via various optical components) disposed on the sample stage 106. Further, the various optical components of the inspection sub-system 102 may be configured to direct light reflected and/or scattered from the surface of the sample 104 to the detector of the inspection sub-system 102. By way of another example, the detector of the inspection sub-system 102 may include any appropriate detector known in the art. For instance, the detector may include, but is not limited to, photo-multiplier tubes (PMTs), charge coupled devices (CCDs), time delay integration (TDI) cameras, and the like. In addition, the output of the detector may be communicatively coupled to a controller 110, described in detail further herein.

In one embodiment, the sample 104 includes a wafer. For example, the sample 104 may include, but is not limited to, a semiconductor wafer. As used through the present disclosure, the term "wafer" refers to a substrate formed of a semiconductor and/or non-semi-conductor material. For instance, a semiconductor or semiconductor material may include, but are not limited to, monocrystalline silicon, gallium arsenide, and indium phosphide.

In another embodiment, the sample stage 106 may include any appropriate mechanical and/or robotic assembly known in the art. In another embodiment, the controller 110 may actuate the sample stage 106. For example, the sample stage 106 may be configured by the controller 110 to actuate the sample 104 to a selected position or orientation. For instance, the sample stage 106 may include or may be mechanically coupled to one or more actuators, such as a motor or servo, configured to translate or rotate the sample 104 for positioning, focusing, and/or scanning in accordance with a selected inspection or metrology algorithm, several of which are known to the art.

In one embodiment, the controller 110 includes one or more processors 112 and a memory medium 114. In another embodiment, one or more sets of program instructions 116 are stored in memory medium 114. In another embodiment, the one or more processors 112 are configured to execute the sets of program instructions 116 to carry out one or more of the various steps described throughout the present disclosure.

In another embodiment, the controller 110 is configured to receive and/or acquire data or information from other systems or sub-systems (e.g., one or more sets of information from the inspection sub-system 102 or from any of the components of the inspection sub-system 102, or one or more user inputs received via the user interface 120) by a transmission medium that may include wireline and/or wireless portions. For example, the inspection sub-system 102 or any of the components of the inspection sub-system 102 may transmit one or more sets of information regarding the operation of the inspection sub-system 102 or any of the components of the inspection sub-system 102 to the controller 110. By way of another example, the inspection sub-system 102 may transmit one or more images of one or more inspected regions of the one or more samples 104 to the controller 110. For instance, the one or more images transmitted to the controller 110 may include, but are not limited to, one or more low-resolution images, one or more low-resolution image patches, or point spread function (PSF). It is noted the low-resolution images, the low-resolution image patches, and the PSF are discussed in detail further herein.

In another embodiment, the system 100 includes one or more encoders in the inspection sub-system 102, where the encoders aggregate one or more sets of information (e.g., the low-resolution image patches of one or more low-resolution images of the sample 104) prior to transmission to the controller 110. In another embodiment, the system 100 includes one or more stage encoders on the stage 106. In another embodiment, the system 100 includes one or more decoders in the controller 110 to de-aggregate one or more sets of information (e.g., the low-resolution image patches) transmitted by the inspection sub-system 102. In another embodiment, the system 100 includes one or more encoders in the controller 110, where the encoders aggregate one or more sets of information (e.g. the low-resolution image patches) following receipt of the sets of information from the inspection sub-system 102.

In another embodiment, the controller 110 of the system 100 is configured to transmit data or information (e.g., the output of one or more procedures disclosed herein) to one or more systems or sub-systems (e.g., one or more commands to the inspection sub-system 102 or to any of the components of the inspection sub-system 102, the sample stage 106, or one or more outputs displayed on the user interface 120) by a transmission medium that may include wireline and/or wireless portions. In this regard, the transmission medium may serve as a data link between the controller 110 and other subsystems of the system 100. In another embodiment, the controller 110 is configured to send data to external systems via a transmission medium (e.g., network connection).

In one example, a detector of the inspection sub-system 102 may be coupled to the controller 110 in any suitable manner (e.g., by one or more transmission media indicated by the dotted line shown in FIG. 1) such that the controller 110 may receive the output generated by the detector. By way of another example, if the inspection sub-system 102 includes more than one detector, the controller 110 may be coupled to the multiple detectors as described above. It is noted herein the controller 110 may be configured to detect one or more defects of the sample 104 using detection data collected and transmitted by the inspection sub-system 102, utilizing any method and/or algorithm known in the art to detect defects on the wafer. For example, the inspection sub-system 102 may be configured to accept instructions from another subsystem of the system 100 including, but not limited to, controller 110. Upon receiving the instructions from the controller 110, the inspection sub-system 102 may perform an inspection process at one or more locations (e.g., one or more regions to be inspected) of the sample 104 identified in the provided instructions (i.e., the inspection recipe), transmitting the results of the inspection process to the controller 110.

In one embodiment, the set of program instructions 116 are programmed to cause the one or more processors 112 to acquire one or more low-resolution images of a wafer, where the one or more low-resolution images include one or more low-resolution image patches, where the one or more low-resolution image patches include one or more sub-pixel shifts. In another embodiment, the set of program instructions 116 are programmed to cause the one or more processors 112 to aggregate the one or more low-resolution image patches. In another embodiment, the set of program instructions 116 are programmed to cause the one or more processors 112 to estimate the one or more sub-pixel shifts and simultaneously reconstruct one or more high-resolution point spread functions (PSF) from the aggregated one or more low-resolution image patches.

In one embodiment, the one or more processors 112 of controller 110 include any one or more processing elements known in the art. In this sense, the one or more processors 112 may include any microprocessor device configured to execute algorithms and/or instructions. For example, the one or more processors 112 may consist of a desktop computer, mainframe computer system, workstation, image computer, parallel processor, vehicle on-board computer, handheld computer (e.g., tablet, smartphone, or phablet), or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. The term "processor" may be broadly defined to encompass any device having one or more processing elements, which execute the program instructions 116 from a non-transitory memory medium (e.g., memory 114). Moreover, different subsystems of the system 100 (e.g., inspection sub-system 102 or user interface 120) may include processor or logic elements suitable for carrying out at least a portion of the steps described throughout the present disclosure. Therefore, the above description should not be interpreted as a limitation on the present disclosure but merely an illustration.

In one embodiment, the memory medium 114 of controller 110 includes any storage medium known in the art suitable for storing the program instructions 116 executable by the associated one or more processors 112. For example, the memory medium 114 may include a non-transitory memory medium. For instance, the memory medium 114 may include, but is not limited to, a read-only memory, a random access memory, a magnetic or optical memory device (e.g., disk), a magnetic tape, a solid state drive and the like. In another embodiment, it is noted herein that the memory 114 is configured to provide display information to a display device 122 and/or the output of the various steps described herein. It is further noted that memory 114 may be housed in a common controller housing with the one or more processors 112. In an alternative embodiment, the memory 114 may be located remotely with respect to the physical location of the processors 112 and controller 110. For instance, the one or more processors 112 of controller 110 may access a remote memory (e.g., server), accessible through a network (e.g., internet, intranet and the like). In another embodiment, the memory medium 114 stores the program instructions 116 for causing the one or more processors 112 to carry out the various steps described through the present disclosure.

In another embodiment, the user interface 120 is communicatively coupled to the one or more processors 112 of controller 110. In another embodiment, the user interface 120 includes a display device 122. In another embodiment, the user interface 120 includes a user input 124.

In one embodiment, the display device 122 includes any display device known in the art. For example, the display device may include, but is not limited to, a liquid crystal display (LCD). By way of another example, the display device may include, but is not limited to, an organic light-emitting diode (OLED) based display. By way of another example, the display device may include, but is not limited to, a cathode ray tube (CRT) display. Those skilled in the art should recognize that a variety of display devices may be suitable for implementation in the present disclosure and the particular choice of display device may depend on a variety of factors, including, but not limited to, form factor, cost, and the like. In a sense, any display device capable of integration with the user input device (e.g., touchscreen, bezel mounted interface, keyboard, mouse, trackpad, and the like) is suitable for implementation in the present disclosure.

In one embodiment, the user input device 124 includes any user input device known in the art. For example, user input device 124 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface, those skilled in the art should recognize that a large number of touchscreen interfaces may be suitable for implementation in the present disclosure. For instance, the display device 122 may be integrated with a touchscreen interface, such as, but not limited to, a capacitive touchscreen, a resistive touchscreen, a surface acoustic based touchscreen, an infrared based touchscreen, or the like. In a sense, any touchscreen interface capable of integration with the display portion of a display device is suitable for implementation in the present disclosure. In another embodiment, the user input device 124 may include, but is not limited to, a bezel mounted interface.

The embodiments of the system 100 illustrated in FIG. 1 may be further configured as described herein. In addition, the system 100 may be configured to perform any other steps(s) of any of the system and method embodiment(s) described herein.

It is noted herein that, for purposes of the present disclosure, $-d_x$, $+d_x$, $-d_y$, and $+d_y$ in FIGS. 2A-16D may be any number. It is further noted herein that one or more of $-d_x$, $+d_x$, $-d_y$, and $+d_y$ may be different or identical numbers to the remainder of $-d_x$, $+d_x$, $-d_y$, and $+d_y$. It is further noted herein that $\pm d_x$ and $\pm d_y$ may not be the same number, although displayed on the same axis. However, the above description should not be interpreted as a limitation on the present disclosure but merely an illustration.

It is further noted herein that, for purposes of the present disclosure, a nominal pixel size in FIGS. 2A-16D is 1 μm×1 μm in size. In this regard, a nominal resolution for low-resolution image patches may be 1 μm×1 μm. However, the above description should not be interpreted as a limitation on the present disclosure but merely an illustration.

It is further noted herein that, for purposes of the present disclosure, a nominal light intensity scale of the graphical data represented in FIGS. 2A-16D ranges from 0 to 1. However, the above description should not be interpreted as a limitation on the present disclosure but merely an illustration.

In another embodiment, the controller 110 receives one or more low-resolution image patches from by the inspection sub-system 102, where the low-resolution image patches include one or more points of light of varying intensities. In another embodiment, the controller 110 transforms the one or more low-resolution image patches into one or more high-resolution PSF. It is noted herein a PSF is commonly spherical, elliptical, hourglass in shape, but that the PSF may be any shape known in the art. In another embodiment, PSF are models (e.g., a 3D Airy diffraction pattern) in which the points of light in the low-resolution image patches are spread out to fill a finite area in an image plane. It is noted herein the spreading out of the points of light is a blurring of the points of light by the diffraction of light, where the diffraction of light is one factor in determining the resolution limit of inspection sub-systems.

It is noted herein the size of the PSF may be affected by one or more factors including, but not limited to, wavelength of the one or more points of light or the numerical aperture (NA) of one or more objective lenses of the inspection sub-system 102. For example, a shorter wavelength would create a tighter (i.e., more focused) finite area in an image plane than a longer wavelength. By way of another example, an objective lens with a higher NA value would create a tighter (i.e., more focused) finite area in an image plane than an objective lens with a lower NA value. In this regard, the one or more PSF may be described in terms of one or more inspection properties (e.g., imaging and operating) of the inspection sub-system 102.

In another embodiment, the high-resolution PSF are calculated as a sum of the PSF for each of the points of light. In another embodiment, one or more convolution procedures may combine the points of light imaged by the inspection sub-system 102 with one or more corresponding PSF into one or more combined images.

It is noted that an understanding of PSF associated with the inspection sub-system 102 may aid in proper reconstruction of one or more images via one or more deconvolution procedures. In another embodiment, deconvolving the one or more combined images transforms the one or more combined images into a higher resolution of the low-resolution patches. For example, the transforming may include, but is not limited to, reducing the amount of out-of-focus light and/or blur in the combined images. For instance, transforming the combined images via the one or more deconvolution procedures may reverse the blurring by the one or more PSF of the points of light in the low-resolution image patches.

In the present disclosure, the controller implements one or more super resolution procedures to reconstruct one or more high-resolution PSF from one or more low-resolution image patches. In one embodiment, the one or more super resolution procedures are reliant on the frequency domain of the inspection system. In another embodiment, the one or more super resolution procedures include one or more sub-pixel shifts with a set of low-resolution image patches when reconstructing the high-resolution images.

$$G^i(\omega) = \sum_{k=-\infty}^{k=\infty} G_c\left(\omega - k\frac{2\pi}{\Delta}\right) e^{-j\alpha_i\left(\omega - k\frac{2\pi}{\Delta}\right)} \quad \text{EQ. 1}$$

$$G_c\left(\omega - k\frac{2\pi}{\Delta}\right) \quad \text{EQ. 2}$$

$$\begin{bmatrix} G^1(\omega) \\ \ldots \\ G^M(\omega)e^{-j\alpha_M \omega} \end{bmatrix} = \quad \text{EQ. 3}$$

$$\begin{bmatrix} e^{-jK\frac{2\pi}{\Delta}}e^{+j\alpha_1\omega} & e^{-j(K-1)\frac{2\pi}{\Delta}}e^{+j\alpha_1\omega} & \ldots & e^{+jK\frac{2\pi}{\Delta}}e^{+j\alpha_1\omega} \\ \ldots & \ldots & & \ldots \\ e^{jK\frac{2\pi}{\Delta}}e^{+j\alpha_M\omega} & e^{j(K-1)\frac{2\pi}{\Delta}}e^{+j\alpha_M\omega} & \ldots & e^{-jK\frac{2\pi}{\Delta}}e^{+j\alpha_M\omega} \end{bmatrix}$$

$$\begin{bmatrix} G_c\left(\omega + K\frac{2\pi}{\Delta}\right) \\ G_c\left(\omega + (K-1)\frac{2\pi}{\Delta}\right) \\ G_c\left(\omega - K\frac{2\pi}{\Delta}\right) \end{bmatrix}$$

In one embodiment, EQ. 1 expresses the frequency spectrum $G^i(\omega)$. In EQ. 1, a shift $\alpha_i$ relative to a common arbitrary reference of the $i^{th}$ measurement is assumed. In another embodiment, EQ. 2 expresses the true signal spectrum point $G_c(\omega)$. In another embodiment, the true signal spectrum point $G_c(\omega)$ is recovered in order to reconstruct a high-resolution PSF in a spatial domain. In another embodiment, there are a finite number of true spectrum points $$G_c\left(\omega - k\frac{2\pi}{\Delta}\right)$$

that contribute to the observed, aliased low-resolution spectrum k (i.e., where k=−K . . . 0 . . . K) in the case of a bandlimited signal. Due to the finite number of true spectrum points $G_c(\omega)$, the high-resolution reconstruction may be reduced to the set of linear procedures for $G(\omega)$, as expressed in the set of linear equations EQ. 3. In EQ. 1, EQ. 2, and EQ. 3, $\Delta$ represents sampling grid spacing.

In another embodiment, there are 2K+1 true spectrum points $$G_c\left(\omega - k\frac{2\pi}{\Delta}\right)$$

to be solved for each observed frequency point $\omega$ from M low-resolution frames on the left side of the linear equations EQ. 3. In another embodiment, stage motion in both spinning (e.g., radial) and translation (e.g., tangential) directions are tracked by one or more stage encoders. For example, one or more sets of information from the one or more stage encoders may be of an acceptable level of resolution and accuracy such that the one or more sets of information may be entered into the set of linear equations EQ. 3.

It is noted herein the one or more low-resolution images may be captured during calibration of the inspection sub-system 102, where the low-resolution images include one or more low-resolution image patches. For example, the one or more low-resolutions images may be captured during calibration by scanning one or more selected regions of the sample 104 with one or more deposited particles through one or more iterations, recording the data acquisition location. In this regard, a randomly distributed relative acquisition location throughout a sensor pixel is obtained.

Figure 2B:
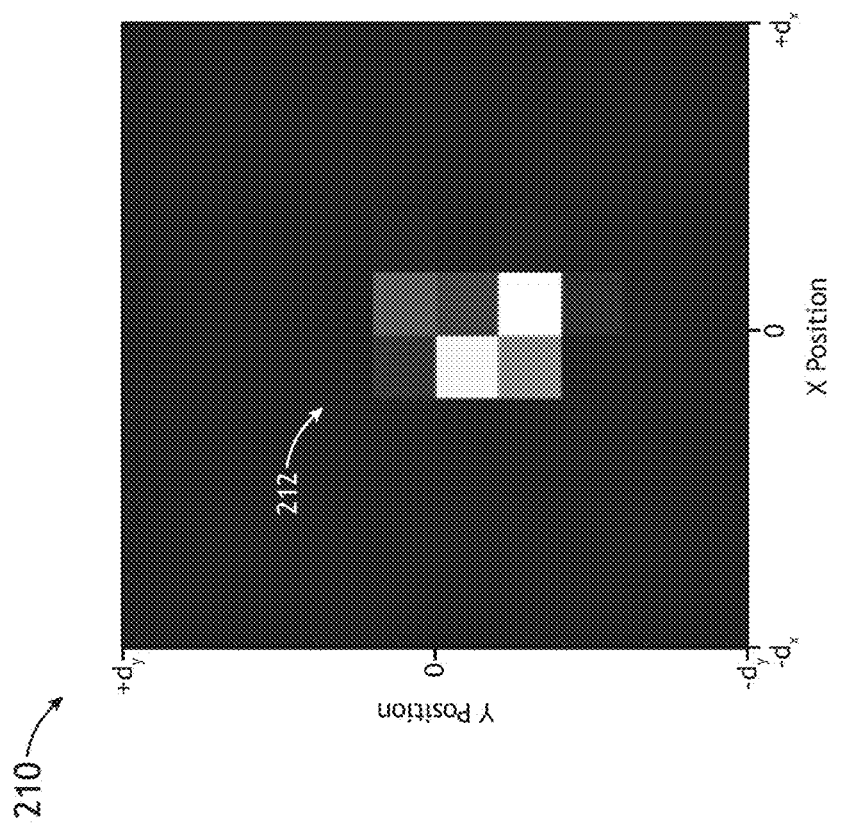
FIG. 2B illustrates graphical data of an observed PSF, in accordance with one or more embodiments of the present disclosure.

FIGS. 2A and 2B illustrate graphical data of a PSF from a simulated application of the one or more super resolution procedures, in accordance with one or more embodiments of the present disclosure. FIG. 2A illustrates graphical data 200 with a modeled PSF 202. FIG. 2B illustrates graphical data 210 for an observed PSF 212 of a low-resolution image patch.

In one embodiment, intensity noise is added to the modeled PSF 202 in FIG. 2A. For example, the intensity noise was introduced in uncertain locations to mimic real-life scenarios. Simultaneously to the introduction of intensity noise, in another embodiment the resultant energy of adding the intensity noise to the modeled PSF 202 in FIG. 2A is integrated and sampled by each sensor pixel to generate the observed PSF 212 of the graphical data 210 illustrated in FIG. 2B. In another embodiment, the low-resolution image patch 212 is undersampled as compared to FIG. 2A.

Figure 3A:
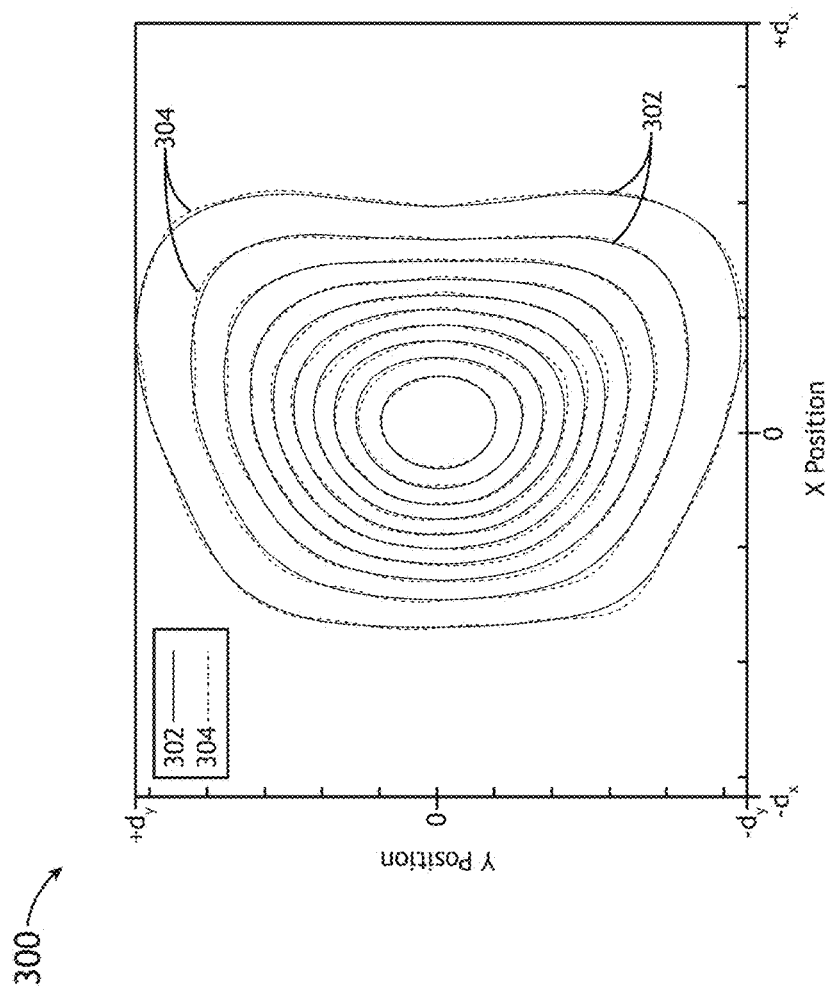
FIG. 3A illustrates graphical data for a reconstruction PSF, in accordance with one or more embodiments of the present disclosure.
Figure 3B:
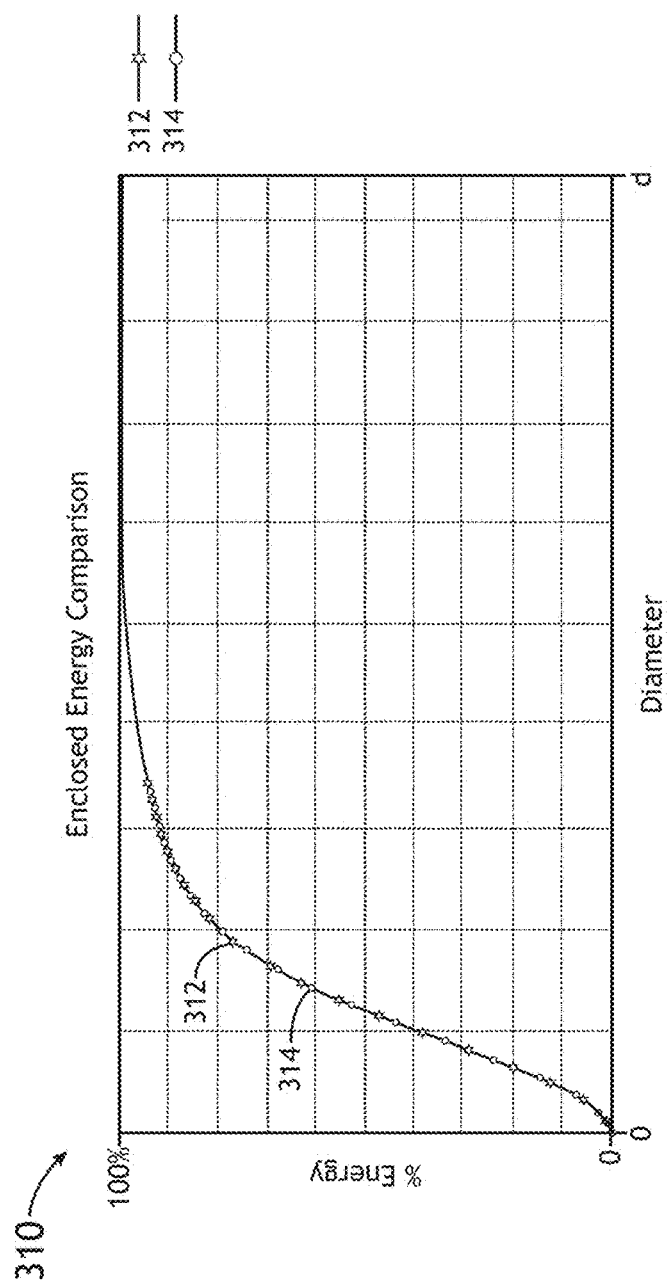
FIG. 3B illustrates graphical data of a contour comparison of a modeled PSF and a reconstructed PSF, in accordance with one or more embodiments of the present disclosure.

FIGS. 3A and 3B illustrate graphical data comparing the modeled PSF 202 and a reconstructed PSF (not shown) generated by applying the super resolution procedure EQ. 3 to the low-resolution image patch illustrated in FIG. 2B. FIG. 3A illustrates graphical data 300 of a contour comparison, with lines 302 representing the modeled PSF 202 illustrated in FIG. 2A and lines 304 representing the PSF reconstructed with the super resolution procedure EQ. 3. It is noted FIG. 3A illustrates a similarity between the contours of the two PSF, especially near the peak of the PSF, where system sensitivity, filter design, and defect sizing are most greatly impacted. FIG. 3B illustrates graphical data 310 comparing the enclosed energy of the modeled PSF versus the PSF reconstructed with super resolution procedure EQ. 3, with line 312 representing the modeled PSF 202 illustrated in FIG. 2A and line 314 representing the PSF reconstructed with the super resolution procedure EQ. 3. As shown in the graphical data of FIGS. 3A and 3B, reconstructing the one or more low-resolution images (e.g., FIG. 2B) with EQ. 3 resulted in an improved resolution of approximately 8×.

FIGS. 4-9C illustrate the testing and application of the one or more super resolution procedures to real-world data, in accordance with one or more embodiments of the present disclosure.

Figure 4:
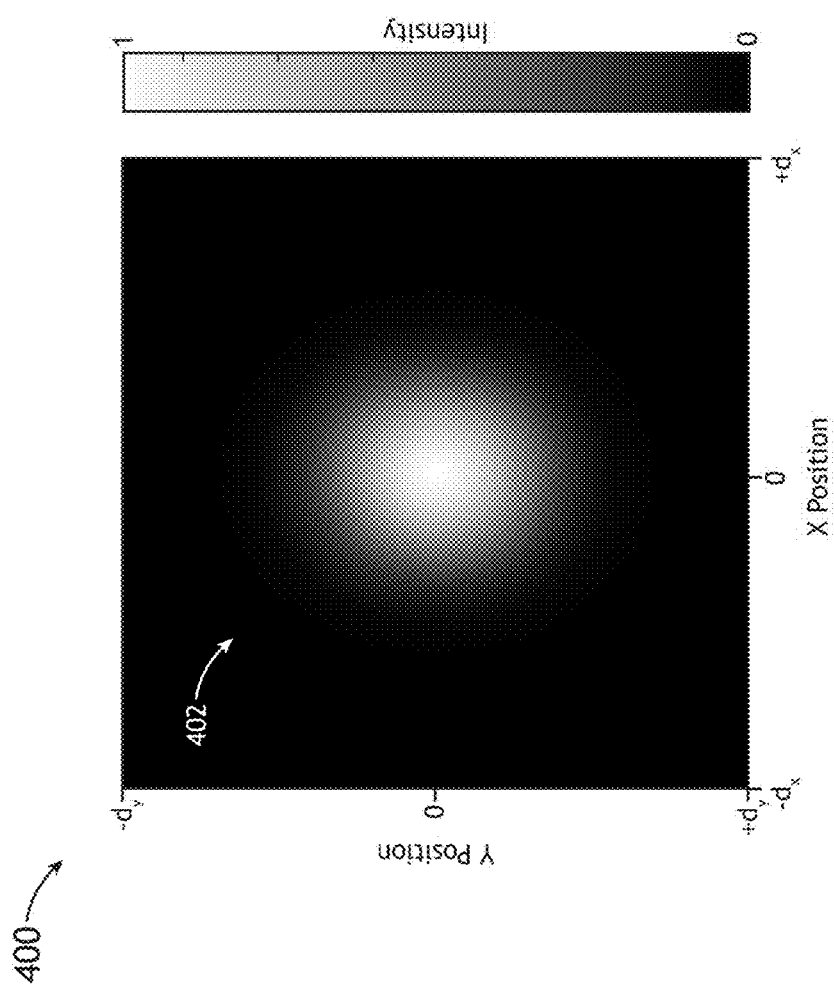
FIG. 4 illustrates graphical data of a modeled PSF, in accordance with one or more embodiments of the present disclosure.

FIG. 4 illustrates graphical data 400 of a modeled PSF 402. In one embodiment, the graphical data 400 includes a Non-Gaussian model. In another embodiment, the PSF 402 is elongated vertically.

FIGS. 5A-5F illustrate three examples of PSF generated from low-resolution image patches, in accordance with one or more embodiments of the present disclosure. The three examples of FIGS. 5A-5F illustrate defects located in different areas of a pixel. In one embodiment, FIGS. 5A-5F include twenty-five pixels 501. For example, the pixels 501 may be a nominal size of 1 μm×1 μm. It is noted herein, however, that a PSF is not limited to the number, or size, of pixel 501 as illustrated in FIGS. 5A-5F. Therefore, the above description should not be interpreted as a limitation on the present disclosure but merely an illustration.

Figure 5A:
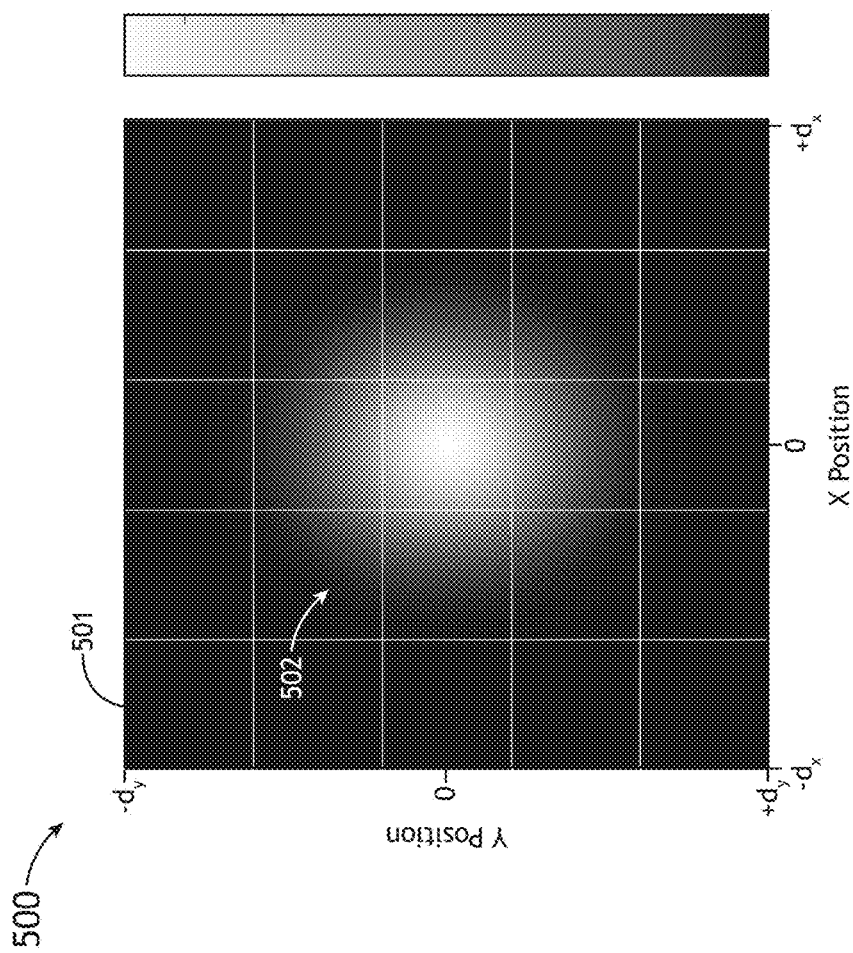
FIG. 5A illustrates graphical data of a modeled PSF, in accordance with one or more embodiments of the present disclosure.
Figure 5B:
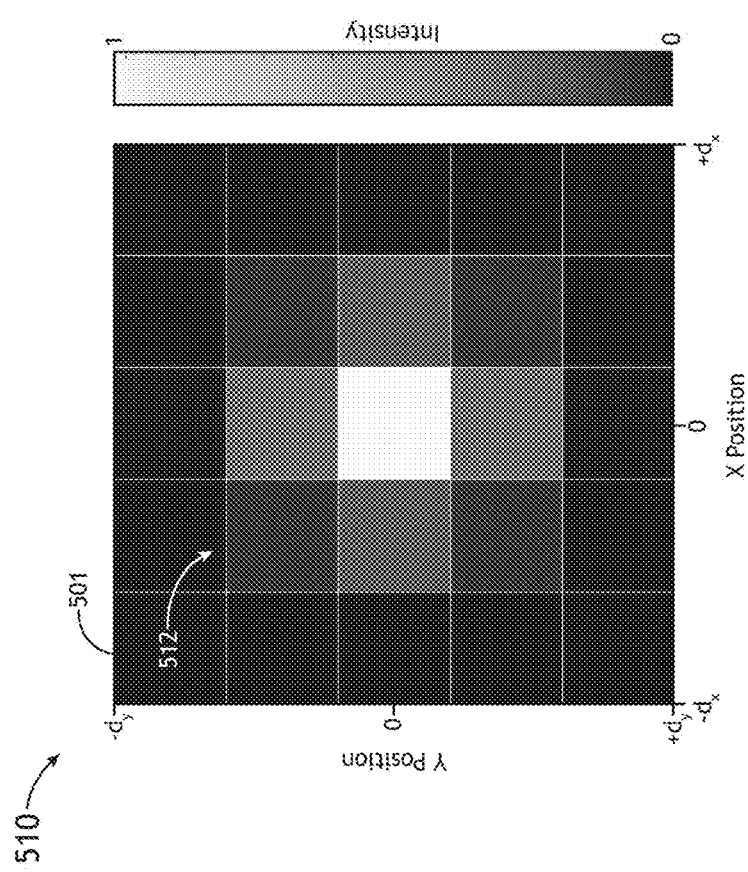
FIG. 5B illustrates graphical data of a low-resolution image patch, in accordance with one or more embodiments of the present disclosure.

FIGS. 5A and 5B illustrate a PSF located at a pixel center (i.e. no PSF shift; PSF located at center pixel (0,0)). FIG. 5A illustrates graphical data 500 of a modeled PSF 502 with pixels 501. FIG. 5B illustrates graphical data 510 of a low-resolution image patch 512 with pixels 501. In one embodiment, the low-resolution image patch 512 illustrates a localized defect captured by the inspection sub-system 102. In another embodiment, fewer defining characteristics of the defect are modeled in the low-resolution image 512 as compared to the modeled PSF 502. For example, the low-resolution image patch 512 illustrates a defect being potentially located in the (0,0) pixel, corresponding to the modeled PSF 502 showing the defect centered in the (0,0) pixel. By way of another example, the low-resolution image patch 512 further illustrates PSF readings in the (±1,0) and (0,±1) pixels, and PSF readings in the (±1,±1) pixels, surrounding the (0,0) pixel.

Figure 5C:
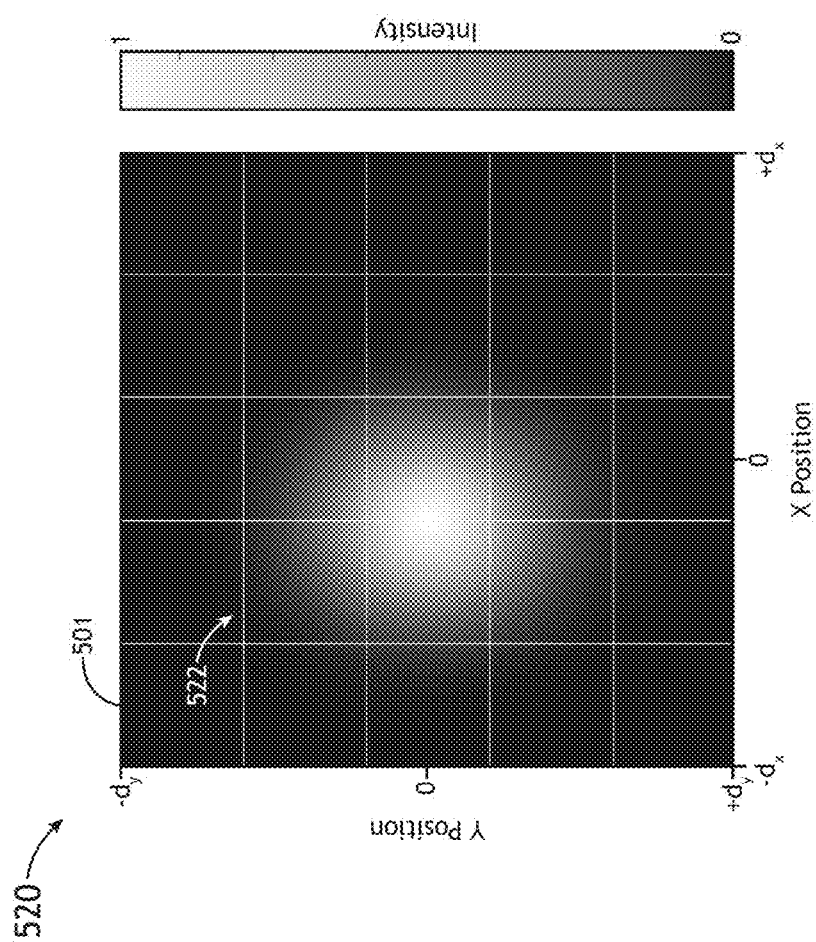
FIG. 5C illustrates graphical data of a modeled PSF, in accordance with one or more embodiments of the present disclosure.
Figure 5D:
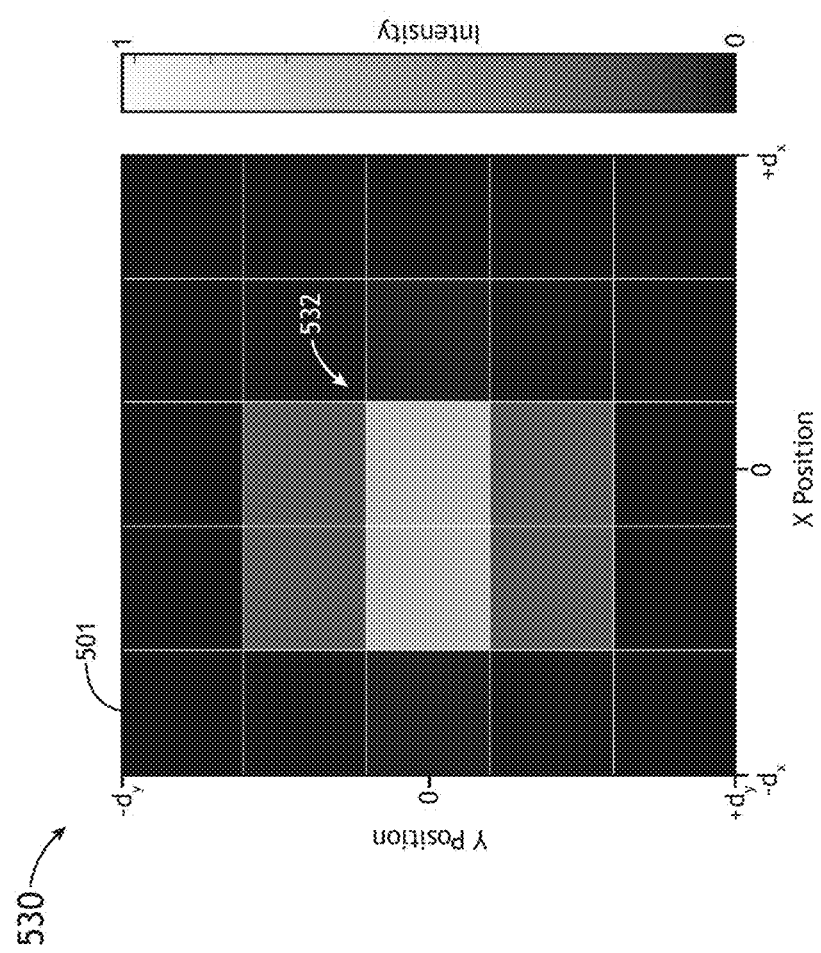
FIG. 5D illustrates graphical data of a low-resolution image patch, in accordance with one or more embodiments of the present disclosure.

FIGS. 5C and 5D illustrate a PSF located at a pixel edge (i.e. a PSF shift to the left of center pixel (0,0)). For example, with the nominal pixel size of 1 μm×1 μm, the PSF shift is at −0.5 μm×0 μm. FIG. 5C illustrates graphical data 520 of a modeled PSF 522 with pixels 501. FIG. 5D illustrates graphical data 530 of a low-resolution the low-resolution image patch 532 with pixels 501. In one embodiment, the low-resolution image 532 illustrates a defect captured by the inspection sub-system 102. In another embodiment, fewer defining characteristics of the defect are modeled in the low-resolution image patch 532 as compared to the modeled PSF 522. For example, the low-resolution image patch 532 illustrates a defect being potentially located in either the (0,0) or (−1,0) pixel, corresponding to the modeled PSF 522 showing the defect centered on the pixel edge between the (0,0) and (−1,0) pixel. By way of another example, the low-resolution image patch 532 further illustrates PSF readings in the (0,±1) and (−1,±1) pixels surrounding the (0,0) and (−1,0) pixels, respectively.

Figure 5E:
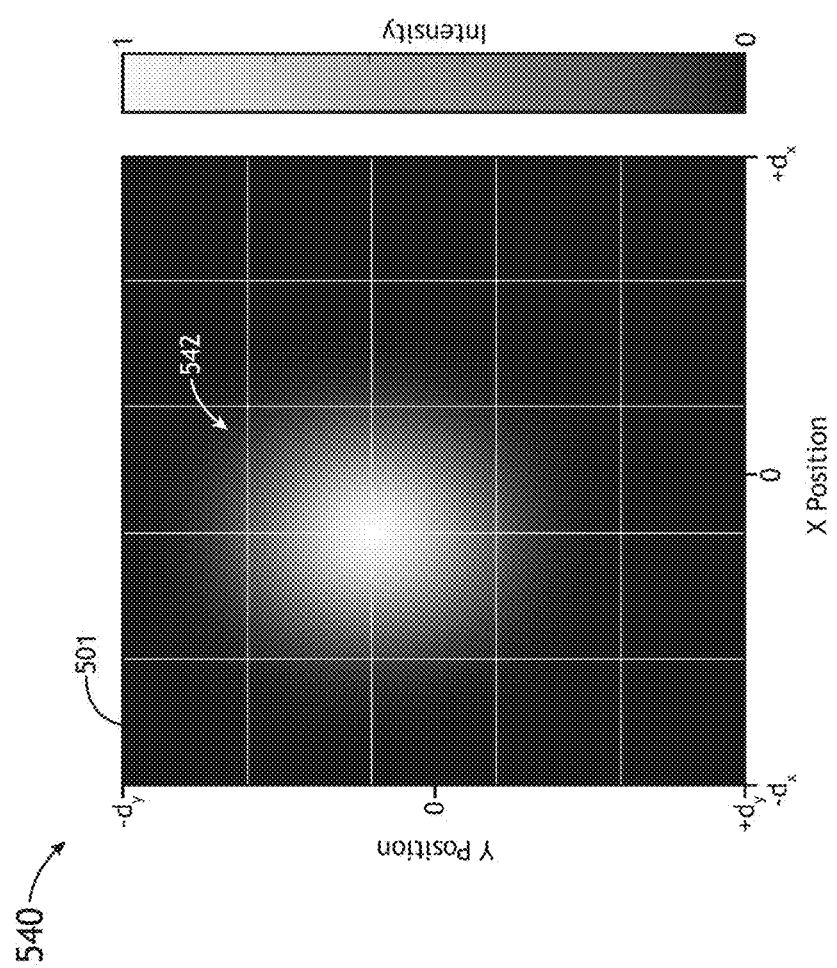
FIG. 5E illustrates graphical data of a modeled PSF, in accordance with one or more embodiments of the present disclosure.
Figure 5F:
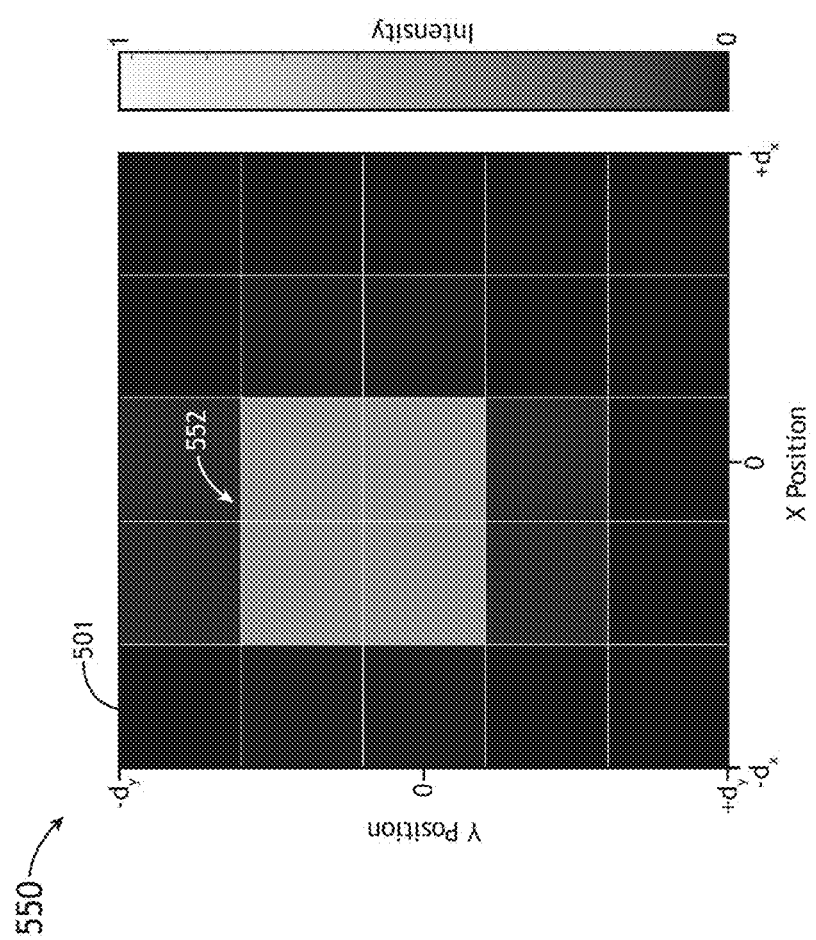
FIG. 5F illustrates graphical data of a low-resolution image patch, in accordance with one or more embodiments of the present disclosure.

FIGS. 5E and 5F illustrate a PSF located at a pixel corner (i.e. a PSF shift up and to the left of center pixel (0,0)). For example, with the nominal pixel size of 1 μm×1 μm, the PSF shift is at −0.5 μm×−0.5 μm. FIG. 5E illustrates graphical data 540 of a modeled PSF 542 with pixels 501. FIG. 5F illustrates graphical data 550 of a low-resolution image patch 552 with pixels 501. In one embodiment, the low-resolution image patch 552 illustrates a defect captured by the inspection sub-system 102. In another embodiment, fewer defining characteristics of the defect are modeled in the low-resolution image patch 552 as compared to the modeled PSF 550. For example, the low-resolution image patch 552 illustrates a defect being potentially located in either the (0,0), (−1,0), (−1,−1), or (0,−1) pixel, corresponding to the modeled PSF 542 showing the defect centered on the pixel corner between the (0,0), (−1,0), (−1,−1), and (0,−1) pixels.

Figure 6A:
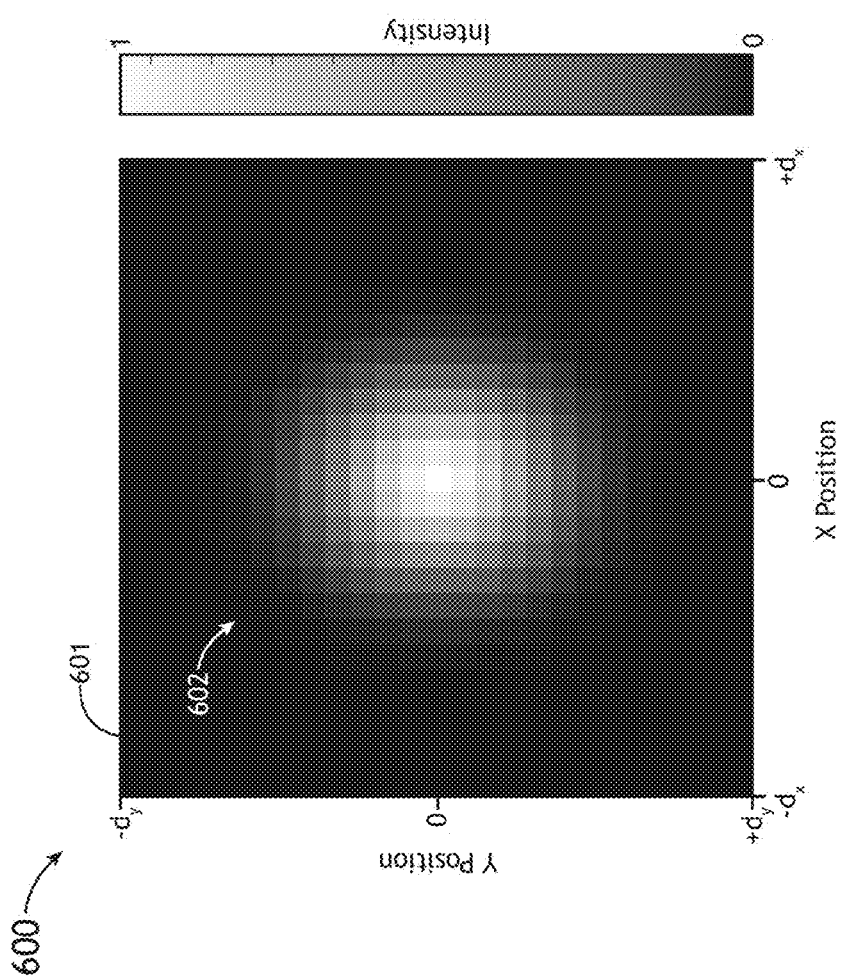
FIG. 6A illustrates graphical data of a modeled PSF, in accordance with one or more embodiments of the present disclosure.
Figure 6B:
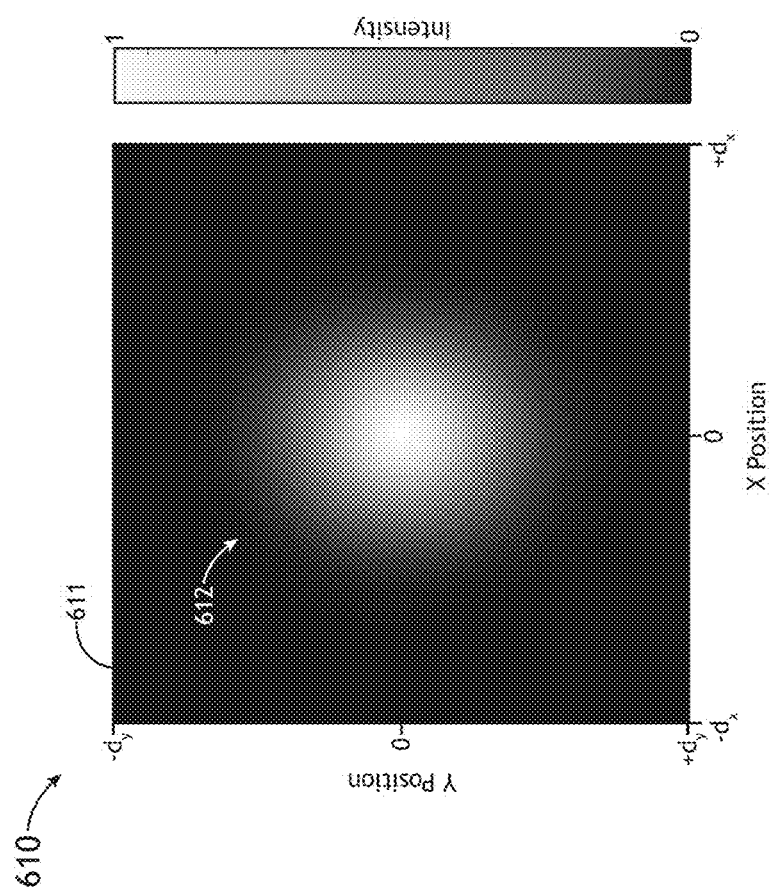
FIG. 6B illustrates graphical data of a modeled PSF, in accordance with one or more embodiments of the present disclosure.

FIGS. 6A and 6B illustrate modeled representations of PSF reconstructed from one or more low-resolution modeled PSF. In one embodiment, the reconstructed PSF are generated by applying one or more super resolution procedures to one or more low-resolution image patches. For example, the reconstructed PSF in FIGS. 6A and 6B may be reconstructed high-resolution PSF of the low-resolution image patch 512 in FIG. 5B. FIG. 6A illustrates graphical data 600 of the high-resolution modeled PSF 602 with pixels 601 reconstructed from one or more low-resolution image patches. In one embodiment, the high-resolution modeled PSF 602 is reconstructed with a pixel size smaller than the pixel size in low-resolution image patch 512. FIG. 6B illustrates graphical data 610 with pixels 611 of a high-resolution modeled PSF 612 reconstructed from one or more low-resolution PSF. In one embodiment, the high-resolution modeled PSF 612 is reconstructed with pixel size smaller than both the pixel size in low-resolution image patch 512 and high-resolution model PSF 602. It is noted the reconstructed 602 and 612 approach the modeled PSF 502 illustrated in FIG. 5A through successive iterations of applying the super resolution procedures to the low-resolution image patches (i.e., image patch 512 illustrated in FIG. 5B).

Figure 7A:
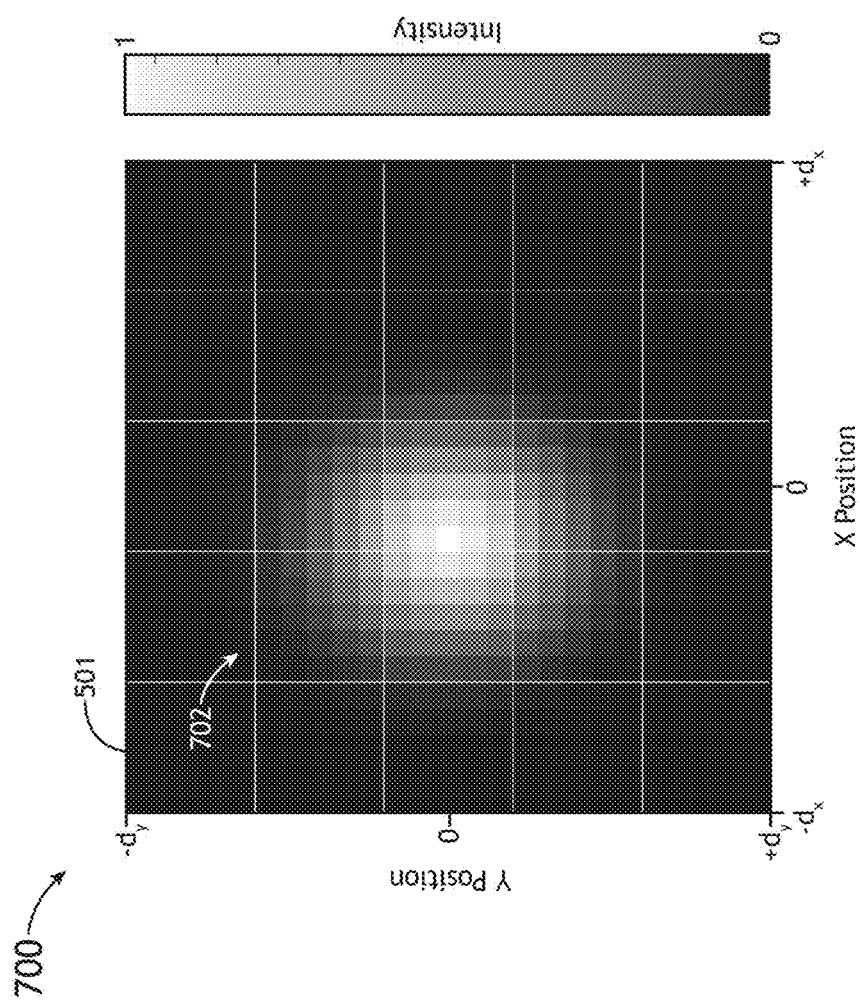
FIG. 7A illustrates graphical data of a modeled PSF, in accordance with one or more embodiments of the present disclosure.
Figure 7B:
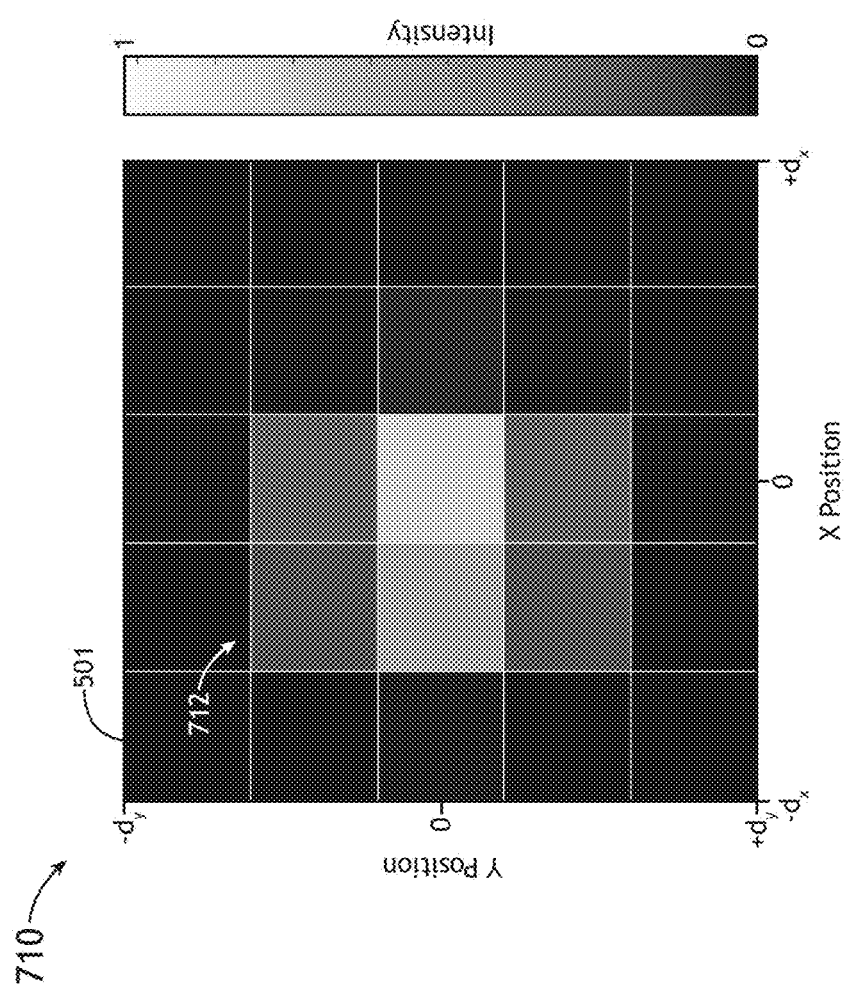
FIG. 7B illustrates graphical data of a low-resolution image patch, in accordance with one or more embodiments of the present disclosure.
Figure 7C:
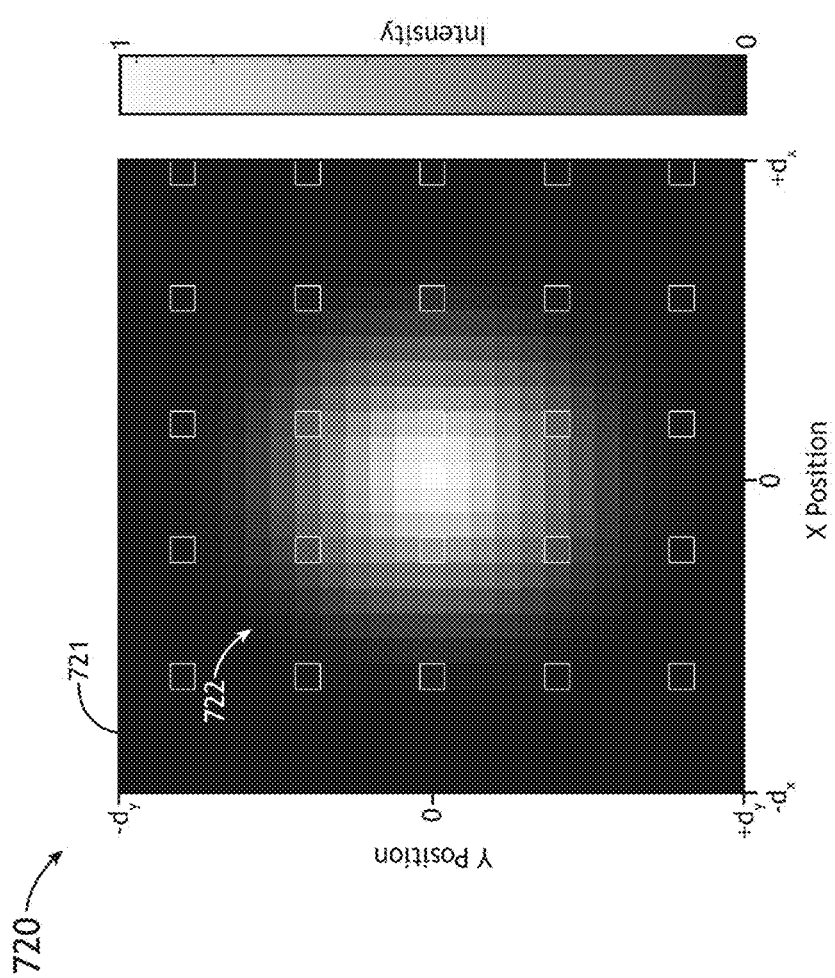
FIG. 7C illustrates graphical data of a modeled PSF, in accordance with one or more embodiments of the present disclosure.

FIGS. 7A-7C illustrate a modeled PSF, in accordance with one or more embodiments of the present disclosure. In FIGS. 7A-7C, a defect is located at a pixel (i.e., a PSF shift to the left of center pixel (0,0)). For example, based on the nominal pixel size of 1 µm×1 µm, the PSF shift is located at −0.4 µm×0 µm. FIG. 7A illustrates graphical data 700 of a high-resolution PSF 702. The graphical data 700 includes twenty-five pixels 501, with the high-resolution PSF 702 being constructed from smaller pixels.

FIG. 7B illustrates graphical data 710 of a low-resolution PSF 712. The graphical data 710 includes twenty-five pixels 501. In one embodiment, the low-resolution image patch 712 is formed by downsampling a convolved PSF such as the high-resolution PSF 702. In another embodiment, the low-resolution image patch 712 illustrates a defect captured by the inspection sub-system 102. In another embodiment, fewer defining characteristics of the defect are modeled in the low-resolution image 712 as compared to the high-resolution PSF 702. For example, the low-resolution PSF 712 illustrates a defect being potentially located in either the (0,0) or (−1,0) pixel (with a greater chance of the defect in the (0,0) pixel), corresponding to the modeled PSF 702 showing the defect centered on the pixel edge between the (0,0) and (−1,0) pixels, and further illustrates PSF readings in the (0,±1) and (−1,±1) pixels surrounding the (0,0) and (−1,0) pixels, respectively.

FIG. 7C illustrates graphical data 720 of a reconstructed high-resolution PSF 722. It is noted the high-resolution PSF 722 is constructed of pixels 721. In one embodiment, the high-resolution PSF 722 is generated with a 5×5 pixel binning convolution procedure.

$$X_d(e^{j\omega_h}, e^{j\omega_v}) = \frac{1}{d_h \times d_v} \sum_{k=0}^{d_h-1} \sum_{l=0}^{d_v-1} X\left(e^{j\left(\frac{\omega_h}{d_h} - \frac{2\pi}{d_h}k\right)} \cdot e^{j\left(\frac{\omega_v}{d_v} - \frac{2\pi}{d_v}l\right)}\right) e^{-j\left(\frac{\omega_h}{d_h} - \frac{2\pi}{d_h}k\right)\Delta_x} e^{-j\left(\frac{\omega_v}{d_v} - \frac{2\pi}{d_v}l\right)\Delta_y} \quad \text{EQ. 4}$$

EQ. 4 illustrates a standard sampling theory equation. In EQ. 4, the terms $$\frac{w_h}{d_h} \text{ and } \frac{w_v}{d_v}$$

represent Fourier Transform (FT) scaling. Additionally, the terms $$\frac{2\pi}{d_h}k \text{ and } \frac{2\pi}{d_v}l$$

represent FT shift. Further, the terms $$-j\left(\frac{w_h}{d_h} - \frac{2\pi}{d_h}k\right) \text{ and } -j\left(\frac{w_v}{d_v} - \frac{2\pi}{d_v}l\right)$$

represent FT phase shift. Further, the terms $\Delta_x$ and $\Delta_y$ represent spatial shift. In one embodiment, one set of procedures EQ. 4 for each ($\Delta_x$, $\Delta_y$) are constructed for a given ($\omega_h$, $\omega_v$). Further, the term X represents a Discrete Time Fourier Transform (DTFT) function of an original signal, and the term $X_d$ represents a DTFT function of a downsampled signal to form a low-resolution image (e.g., low-resolution image patch 712, or the like). Further, the terms $d_h$ and $d_v$ represent sampling grid spacing in pixels. In one embodiment, a linear least squares procedure is applied to EQ. 4 to find its solution.

Figure 7D:
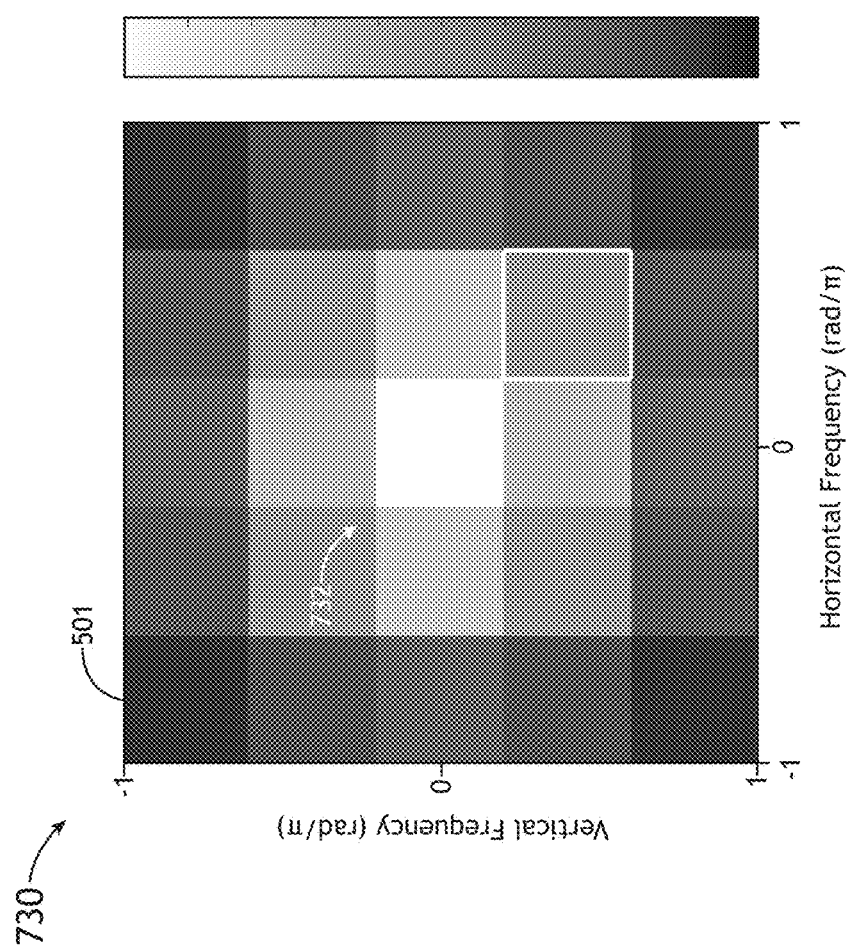
FIG. 7D illustrates graphical data of a low-resolution image patch, in accordance with one or more embodiments of the present disclosure.
Figure 7E:
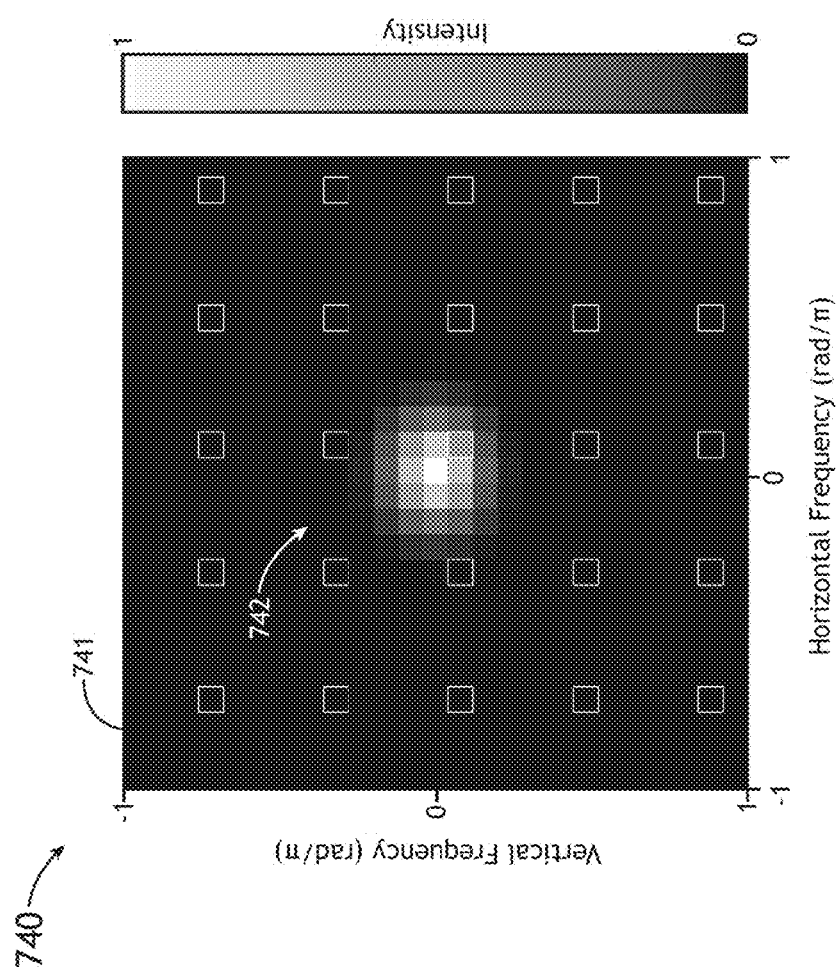
FIG. 7E illustrates graphical data of a modeled PSF, in accordance with one or more embodiments of the present disclosure.

FIGS. 7D and 7E illustrate modeled PSF, in accordance with one or more embodiments of the present disclosure. FIG. 7D illustrates graphical data 730 of a low-resolution image patch 732. The graphical data 730 includes twenty-five pixels 501. FIG. 7D illustrates the Discrete Time Fourier Transform (DTFT) magnitude of the low-resolution image patch 732. FIG. 7E illustrates graphical data 740 of a high-resolution PSF 742 with pixels 741, the high-resolution PSF 742 generated by applying EQ. 4 to the low-resolution image patch 732 with values $\Delta_x$=−0.26/0.13=−2; $\Delta_y$=0; $d_h$=5; and $d_v$=5.

Figure 8A:
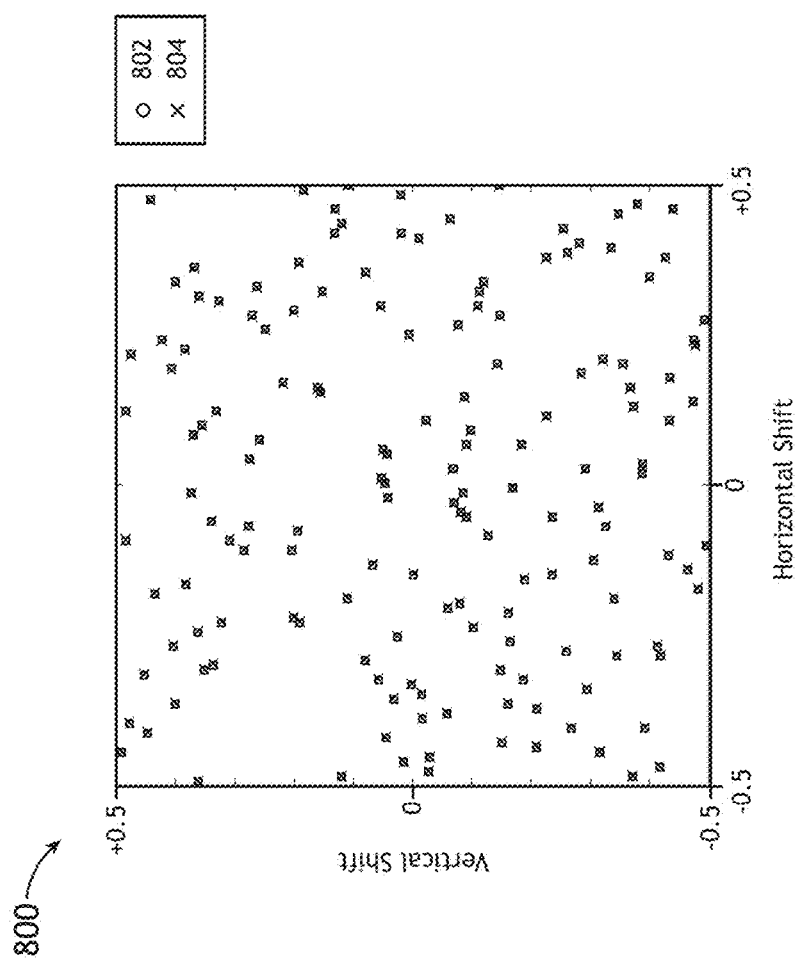
FIG. 8A illustrates graphical data comparing sub-pixel shifts in a low-resolution image patch, in accordance with one or more embodiments of the present disclosure.
Figure 8B:
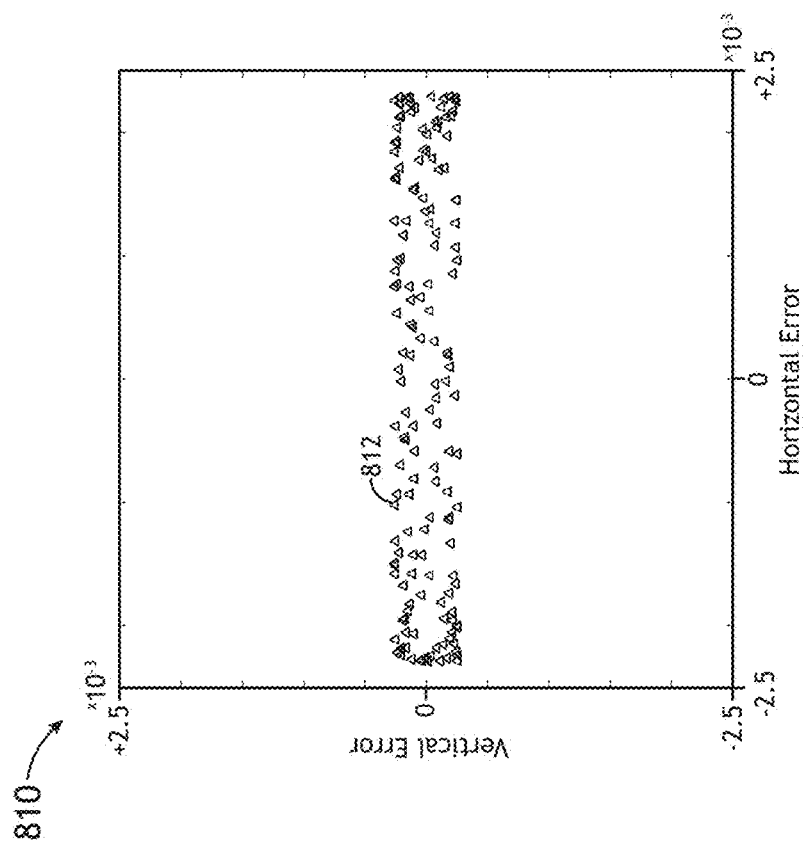
FIG. 8B illustrates graphical data comparing sub-pixel shifts in a low-resolution image patch, in accordance with one or more embodiments of the present disclosure.

FIGS. 8A and 8B illustrate a comparison of one or more sub-pixel shifts at an original sub-pixel shift location and at an estimated sub-pixel shift location, in accordance to the present disclosure. In one embodiment, the sub-pixel shifts are the result of motion generated by intrinsic random jitter (i.e. random tool-generated shifts) of the stage 106. In another embodiment, the sub-pixel shifts are the result of motion manually generated by the controller 110. In another embodiment, the motion of the stage 106 occurs while the inspection sub-system 102 scans one or more inspected regions of the one or more wafers 104 to capture one or more images at a low-resolution, where the one images at the low-resolution include one or more low-resolution image patches.

FIG. 8A illustrates graphical data 800 of the horizontal component and vertical components of one or more sub-pixel shifts (e.g. a 2D sub-pixel shift) in an original location 802 and an estimated location 804. For example, the sub-pixel shifts may be randomly generated by the stage 106 or inspection sub-system 102. By way of another example, the sub-pixel shifts may be applied in a controlled manner. By way of another example, the sub-pixel shifts may be one or more reported and quantized sub-pixel shifts. From FIG. 8A, it is noted that the estimated sub-pixel shifts 804 are very close to the original sub-pixel shifts 802.

FIG. 8B illustrates graphical data 810 including data points 812 representing the horizontal error and vertical error (e.g. 2D error) between the estimated location 804 and the original location 802 for each sub-pixel shift. It is noted that error is larger in the horizontal shift direction because a PSF is narrower in the horizontal direction.

It is noted herein the estimated sub-pixel shifts 804 are generated with a weighted-centroid procedure based on a set of center of mass equations, with pixel intensities used as weights for the weighted-centroid procedure.

Figure 9A:
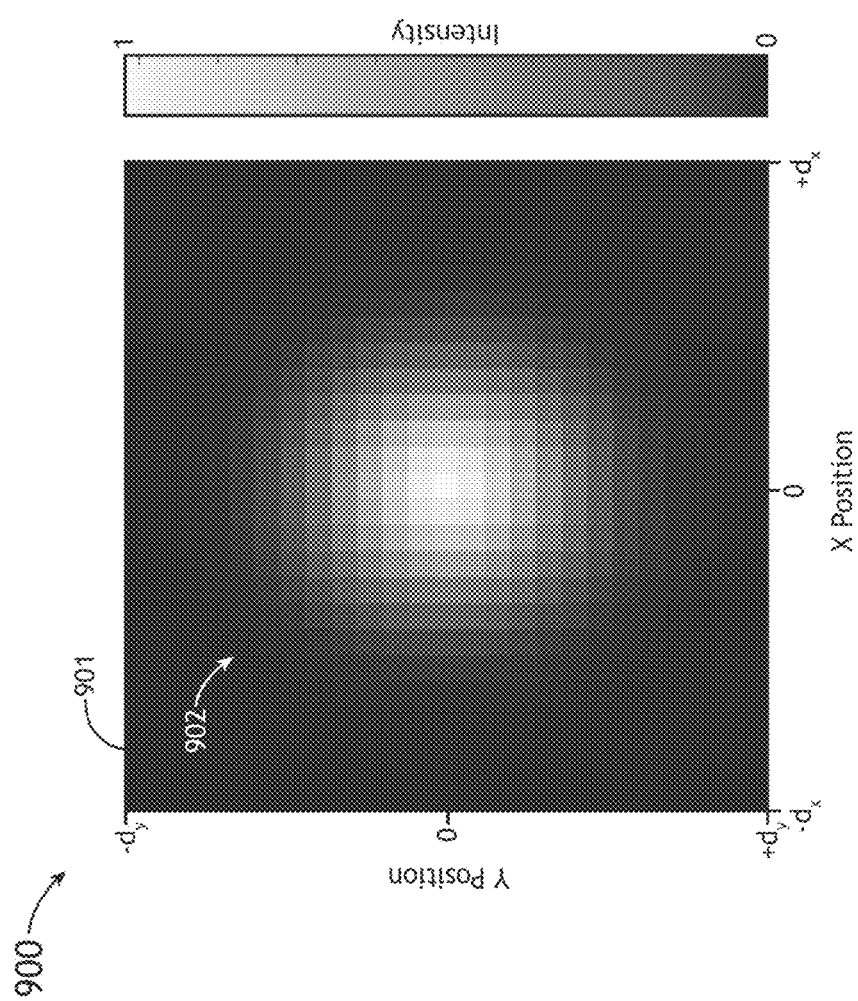
FIG. 9A illustrates graphical data of a modeled PSF, in accordance with one or more embodiments of the present disclosure.
Figure 9B:
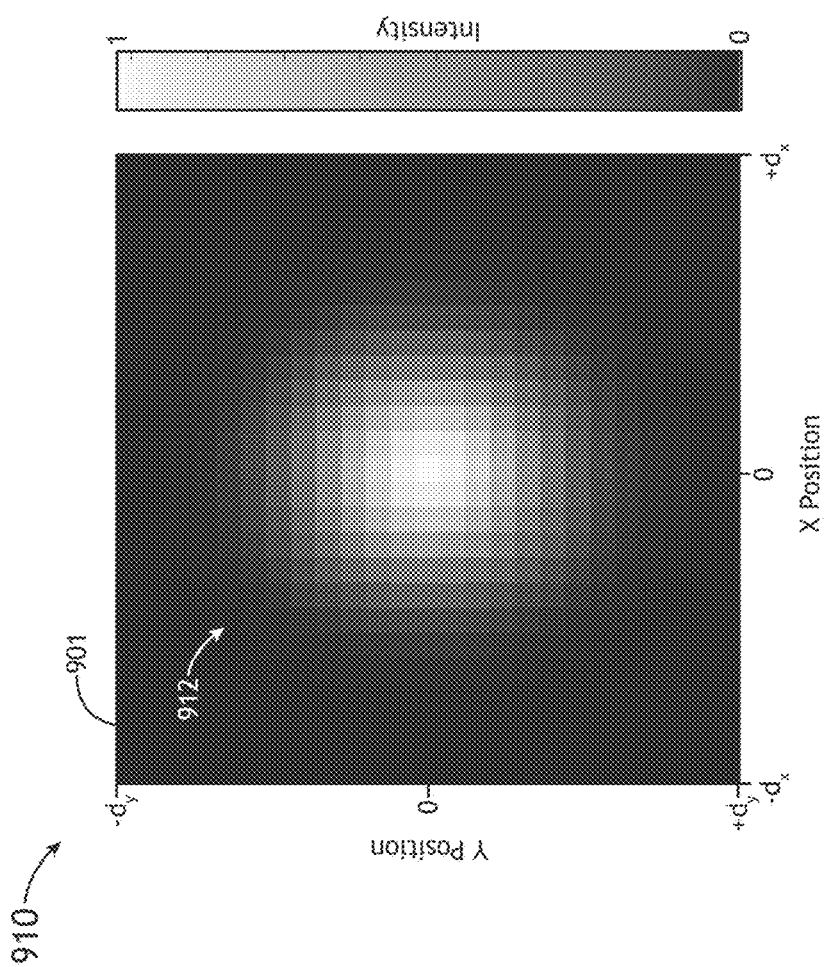
FIG. 9B illustrates graphical data of a reconstructed high-resolution PSF, in accordance with one or more embodiments of the present disclosure.
Figure 9C:
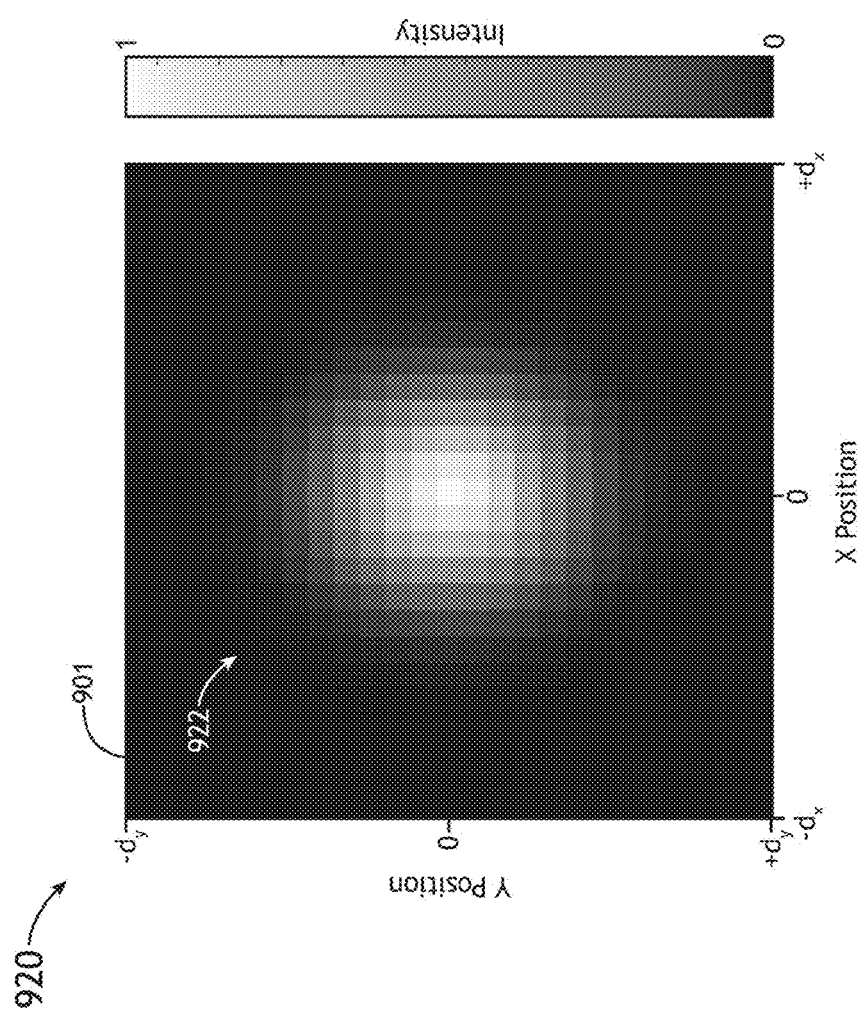
FIG. 9C illustrates graphical data of a reconstructed high-resolution PSF, in accordance with one or more embodiments of the present disclosure.

FIGS. 9A-9C illustrate graphical data for reconstructing high-resolution PSF by including one or more estimated defect sub-pixel shifts in the one or more super resolution procedures, in accordance with one or more embodiments of the present disclosure.

FIG. 9A illustrates graphical data 900 of an estimated PSF 902. It is noted the estimated high-resolution PSF 902 is constructed of pixels 901. In one embodiment, the estimated high-resolution PSF 902 is generated with a 5×5 pixel binning convolution procedure. In another embodiment, the estimated high-resolution PSF 902 is reconstructed from one or more low-resolution image patches. In another embodiment, the estimated high-resolution PSF 902 includes one or more quantized random estimated sub-pixel shift locations and one or more additional estimated sub-pixel shift locations. FIG. 9B illustrates graphical data 910 of an estimated PSF 912. It is noted the PSF 912 is constructed of pixels 901. In one embodiment, the estimated PSF 912 is deconvolved in the FT-domain from the estimated high-resolution PSF 902 in FIG. 9A. In another embodiment, the estimated PSF 912 includes one or more quantized random estimated sub-pixel shift locations and one or more additional estimated sub-pixel shift locations. FIG. 9C illustrates graphical data 920 of an estimated PSF 922. It is noted the high-resolution PSF 922 is constructed of pixels 901. In one embodiment, the estimated PSF 922 is convolved from the estimated PSF 912 in FIG. 9B. In another embodiment, the estimated PSF 922 includes one or more quantized random estimated sub-pixel shift locations and one or more additional estimated sub-pixel shift locations. In another embodiment, a final high-resolution PSF is generated by applying one or more super resolution procedures to the estimated PSF 922.

In one embodiment, one or more advanced applications are performed with the reconstructed high-resolution PSF. In another embodiment, the one or more advanced applications are performed with one or more super resolution processes. In another embodiment, the one or more advanced applications are performed with reconstructed high-resolution PSF and the additional metrics of the optical components for calibration of the inspection sub-system 102.

In another embodiment, the reconstructed high-resolution PSF is one metric for calibration of the inspection sub-system 102. In another embodiment, one or more additional metrics for calibration of the inspection sub-system are generated. For example, one or more optical components of the inspection sub-system 102 may be selected. For instance, the optical components may be positioned before the sensor of the inspection sub-system 102. By way of another example, the one or more additional metrics may be generated for the one or more optical components.

In another embodiment, the reconstructed high-resolution PSF and the additional metrics of optical components in the inspection sub-system 102 are applicable to reducing image speckle and shot noise for films based on speckle pattern.

In another embodiment, the reconstructed high-resolution PSF are applicable to the rejection of cosmic ray noise during wafer inspection and review.

Figure 10A:
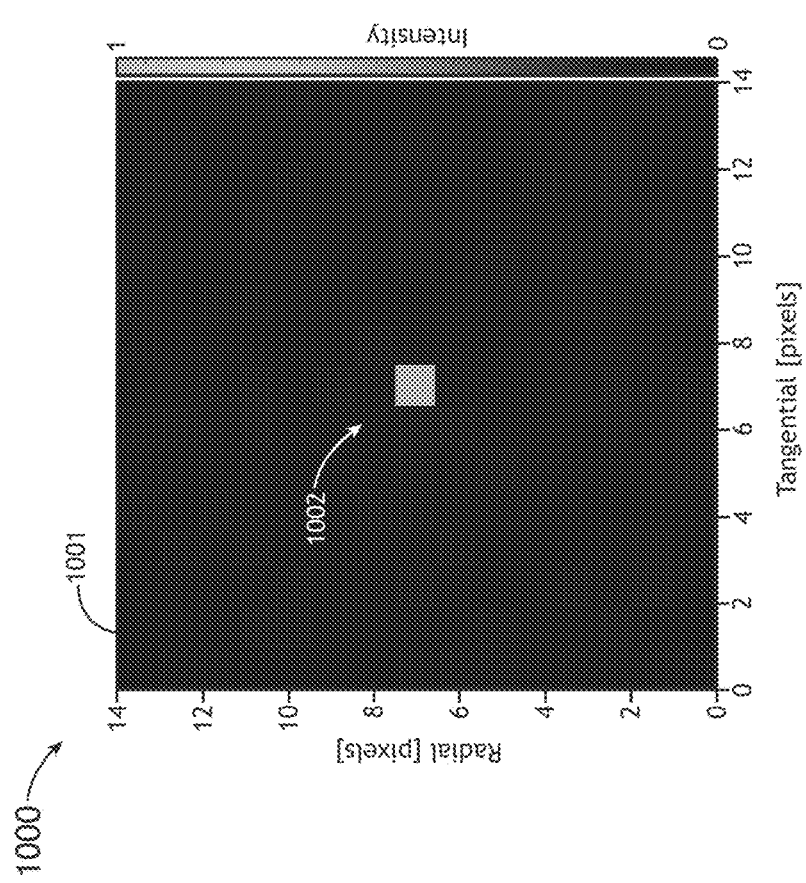
FIG. 10A illustrates graphical data of a PSF image, in accordance with one or more embodiments of the present disclosure.
Figure 10B:
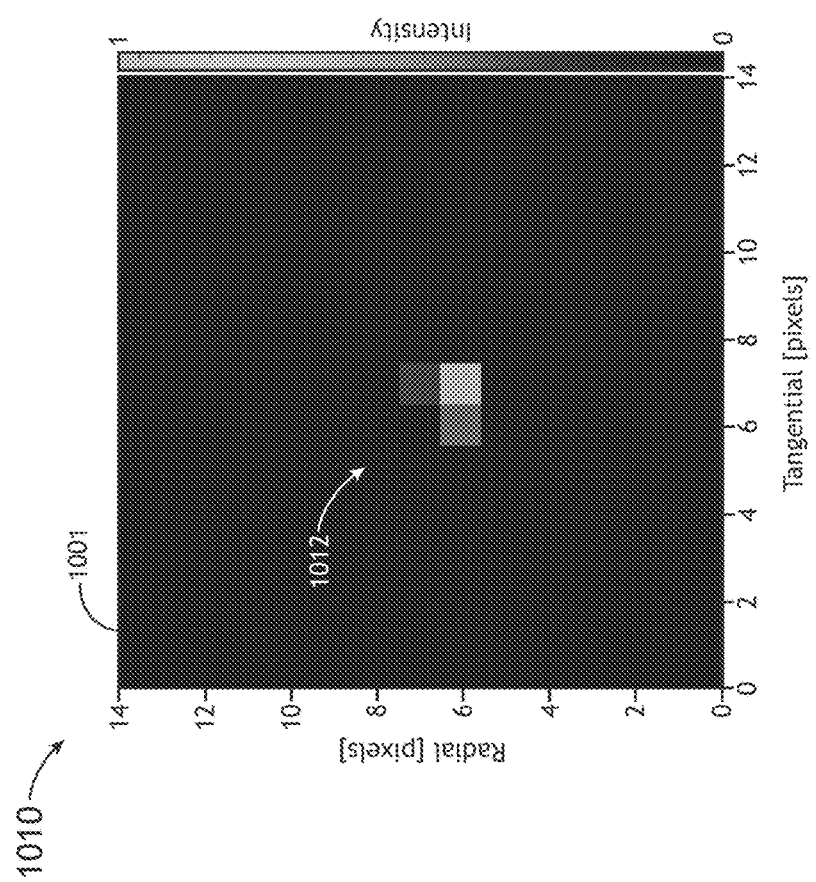
FIG. 10B illustrates graphical data of a PSF image, in accordance with one or more embodiments of the present disclosure.
Figure 10C:
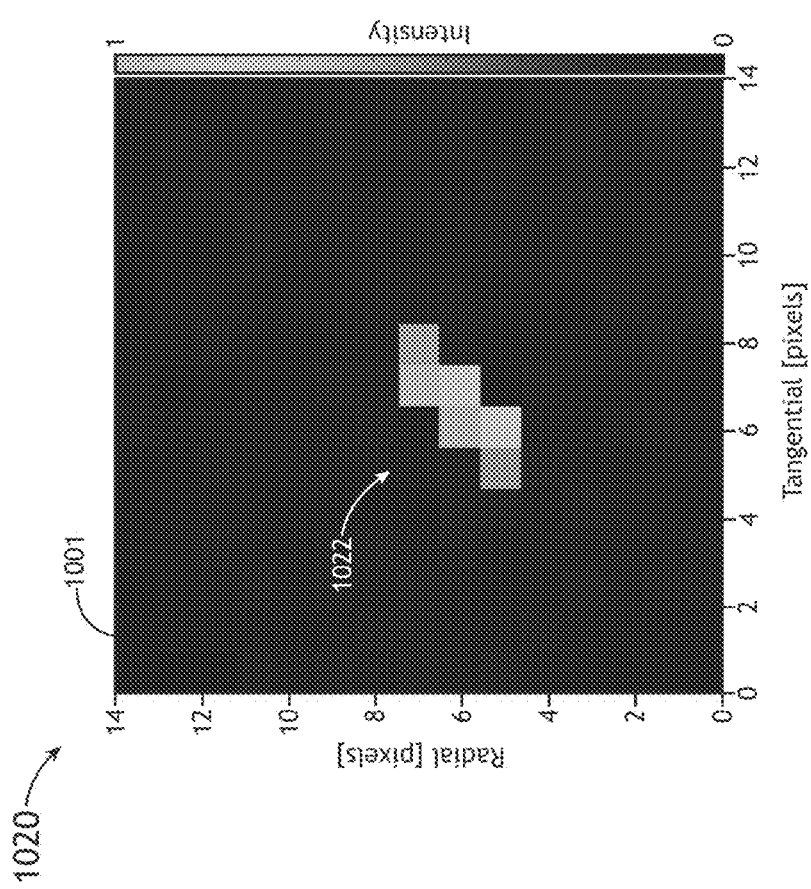
FIG. 10C illustrates graphical data of a PSF image, in accordance with one or more embodiments of the present disclosure.
Figure 10D:
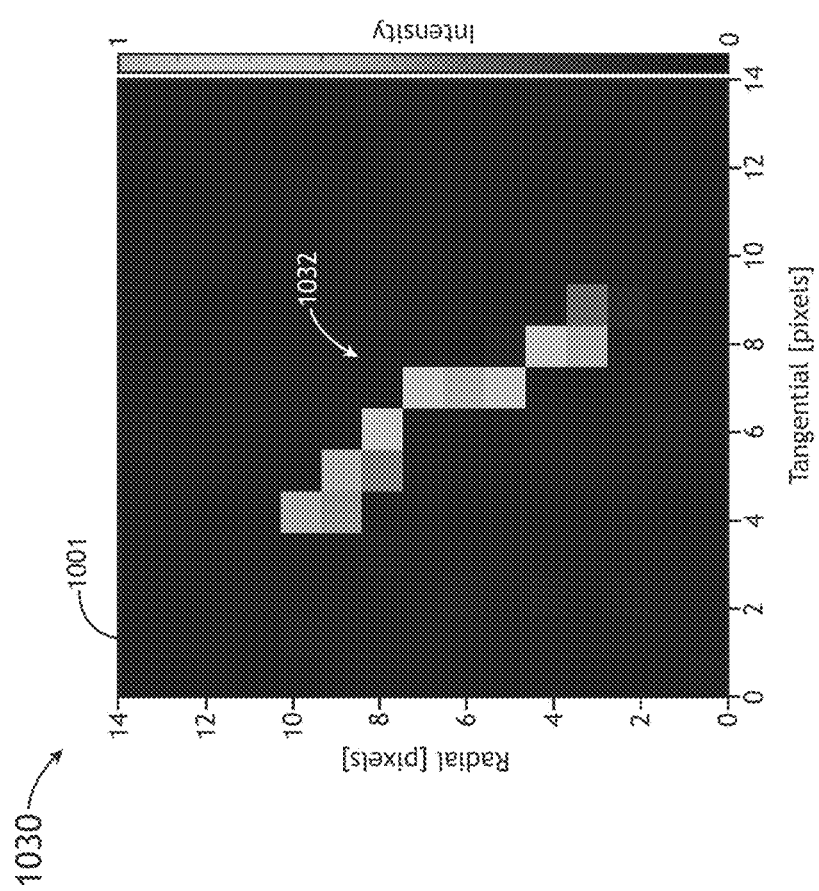
FIG. 10D illustrates graphical data of a PSF image, in accordance with one or more embodiments of the present disclosure.

FIGS. 10A-10D illustrate an observed defect event with pixels 1001, in accordance with one or more embodiments of the present disclosure. In one embodiment, FIG. 10A illustrates graphical data 1000 of a defect event 1002. In another embodiment, FIG. 10B illustrates graphical data 1010 of a defect event 1012. In another embodiment, FIG. 10C illustrates graphical data 1020 of a defect event 1022. In another embodiment, FIG. 10D illustrates graphical data 1030 of a defect event 1032.

$$m(x) = a \int_{Pixels} d^2x' \text{PSF}(x'-x_0) \quad \text{EQ. 5}$$

$$r^2 = \Sigma_x (\text{data}(x) - m(x))^2 \quad \text{EQ. 6}$$

It is noted that cosmic ray signal is independent of system optics, and is therefore not convolved by the PSF. In one embodiment, applying one or more super resolution procedures to reject cosmic ray noise includes first modeling the signal defect in a pixel x=(x, y), where the term x represents a two-dimensional (2D) vector comprised of (x, y), as expressed in EQ. 5. In EQ. 5, the term m(x) represents the low-resolution PSF image for the particular pixel x location, the low-resolution PSF image including a summation of the high-resolution pixels contained within the region. In addition, in EQ. 5 the term $x_n$ represents the location of the center of the low-resolution PSF image. Further, in EQ. 5 the term x' represents a pixel translated a selected distance within the region from the pixel x. Further, in EQ. 5 the term $d^2x'$ represents a two-dimensional (2D) integral. Further, in EQ. 5 the term a represents a selected constant (e.g., an amplitude of fit representing how much to scale the low-resolution PSF image to give a minimum fit error. In another embodiment, the sum of the squared error is minimized with EQ. 6 to determine the residual value $r^2$. In EQ. 6, the term data(x) represents the value of the low-resolution input sample for at location pixel x. In addition, in EQ. 6 the term m(x) is determined via EQ. 5. In another embodiment, the outliers are rejected by thresholding the residual value $r^2$ from EQ. 6. It is noted herein that different thresholds may be used depending on the event intensity. It is further noted herein that the different thresholds may be determined empirically.

It is noted herein that modeled PSF may differ from true PSF (e.g., due to changes in the optical calibration of the inspection sub-system). It is further noted that the residual value $r^2$ from PSF error may increase as event intensity increases.

Figure 11A:
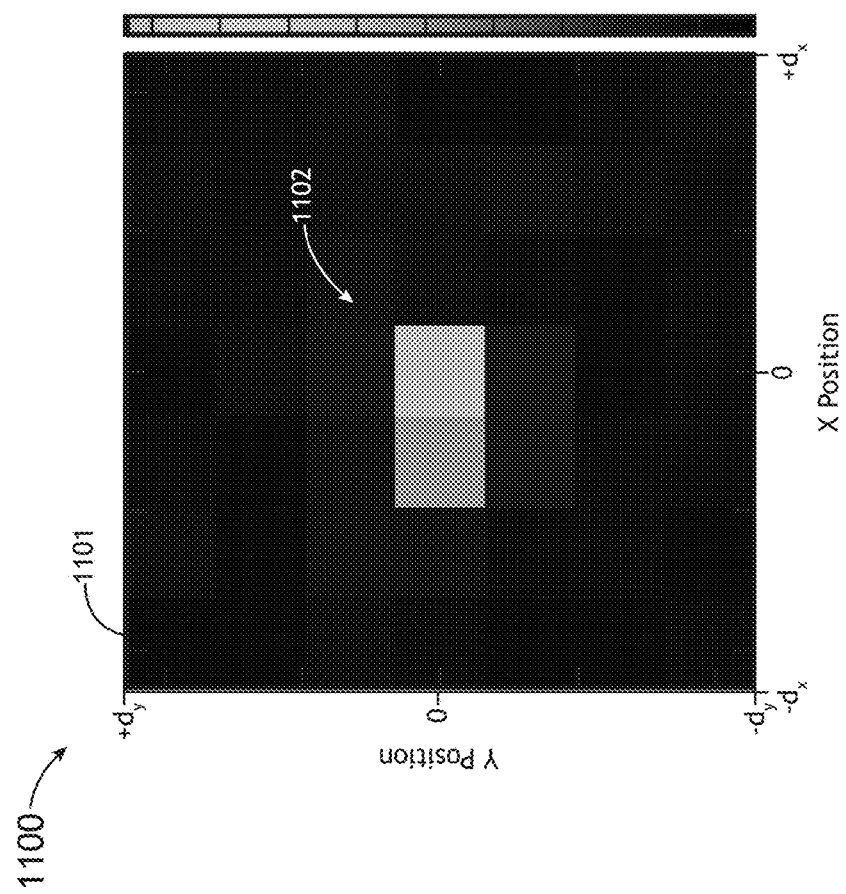
FIG. 11A illustrates graphical data of an observed defect implemented for calibration and testing, in accordance with one or more embodiments of the present disclosure.
Figure 11B:
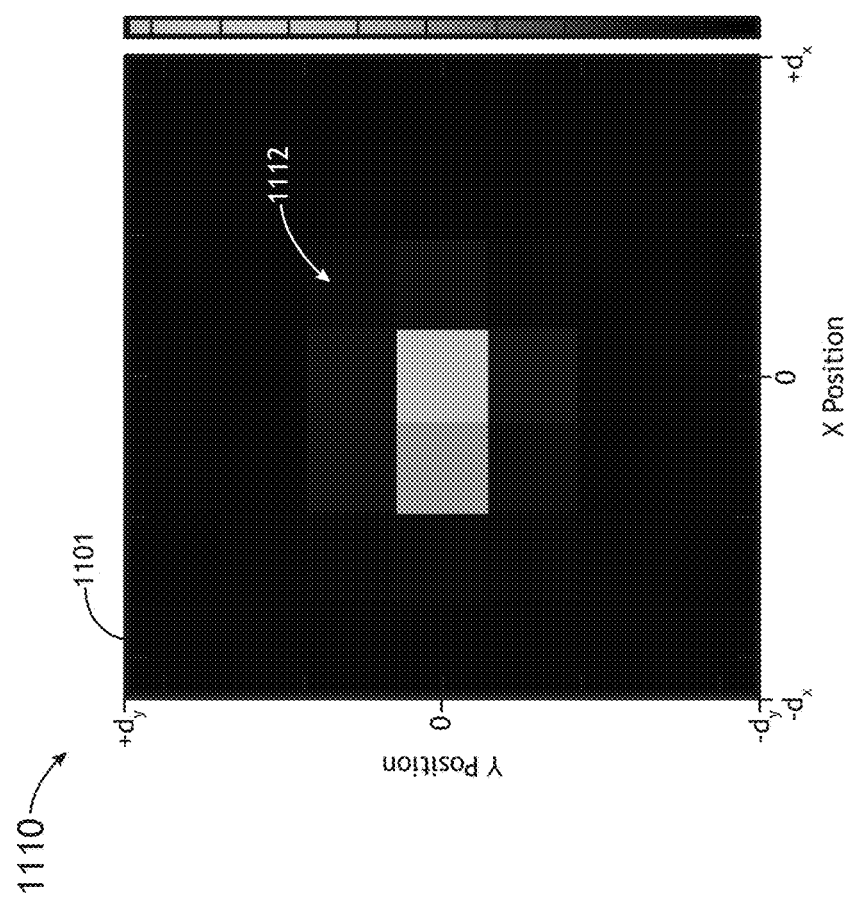
FIG. 11B illustrates graphical data of an observed defect implemented for calibration and testing, in accordance with one or more embodiments of the present disclosure.
Figure 11C:
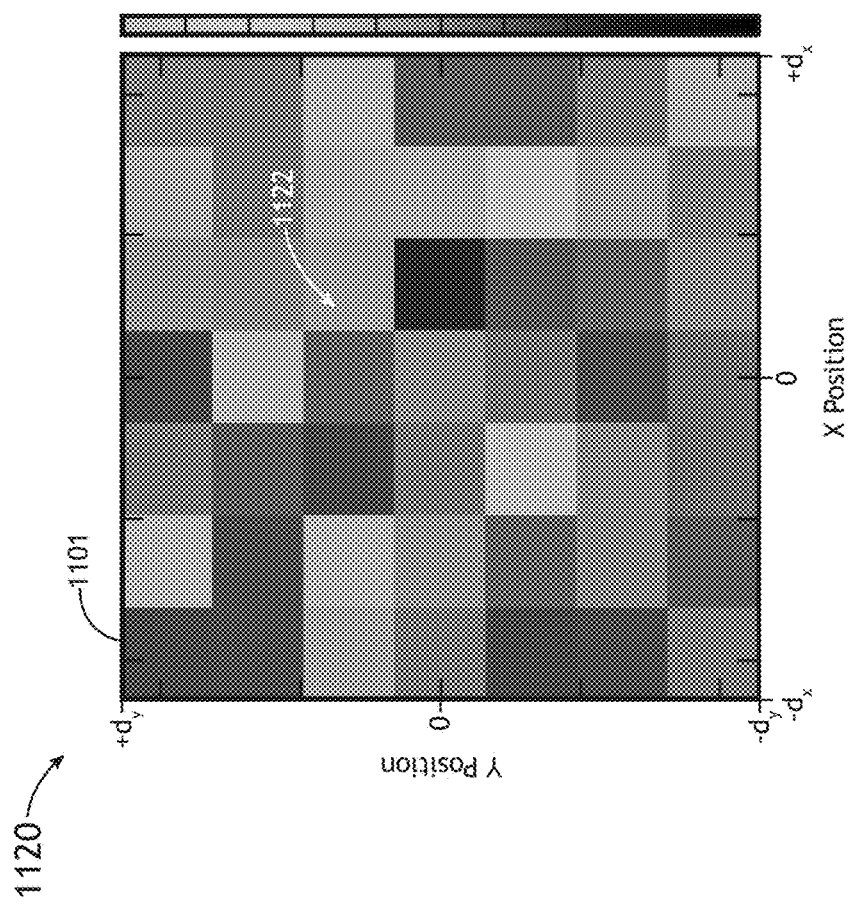
FIG. 11C illustrates graphical data of an observed defect implemented for calibration and testing, in accordance with one or more embodiments of the present disclosure.

FIGS. 11A-11C illustrate graphical data of a real defect, in accordance with one or more embodiments of the present disclosure. It is noted FIGS. 11A-11C have pixels 1101. FIG. 11A illustrates graphical data 1100 of image data 1102. FIG. 11B illustrates graphical data 1110 of a model 1112 generated with EQ. 5 from the image data 1102. FIG. 11C illustrates graphical data 1120 of the residual value $r^2$ 1122 generated with EQ. 6 from the model 1112.

Figure 11D:
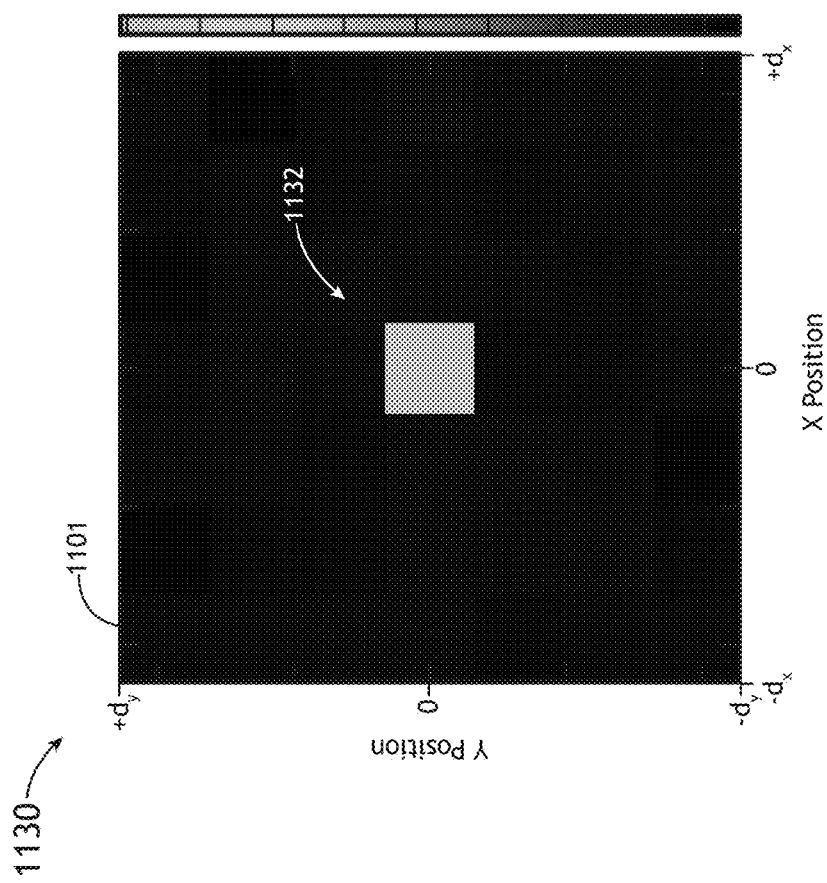
FIG. 11D illustrates graphical data of an observed defect implemented for calibration and testing, in accordance with one or more embodiments of the present disclosure.
Figure 11E:
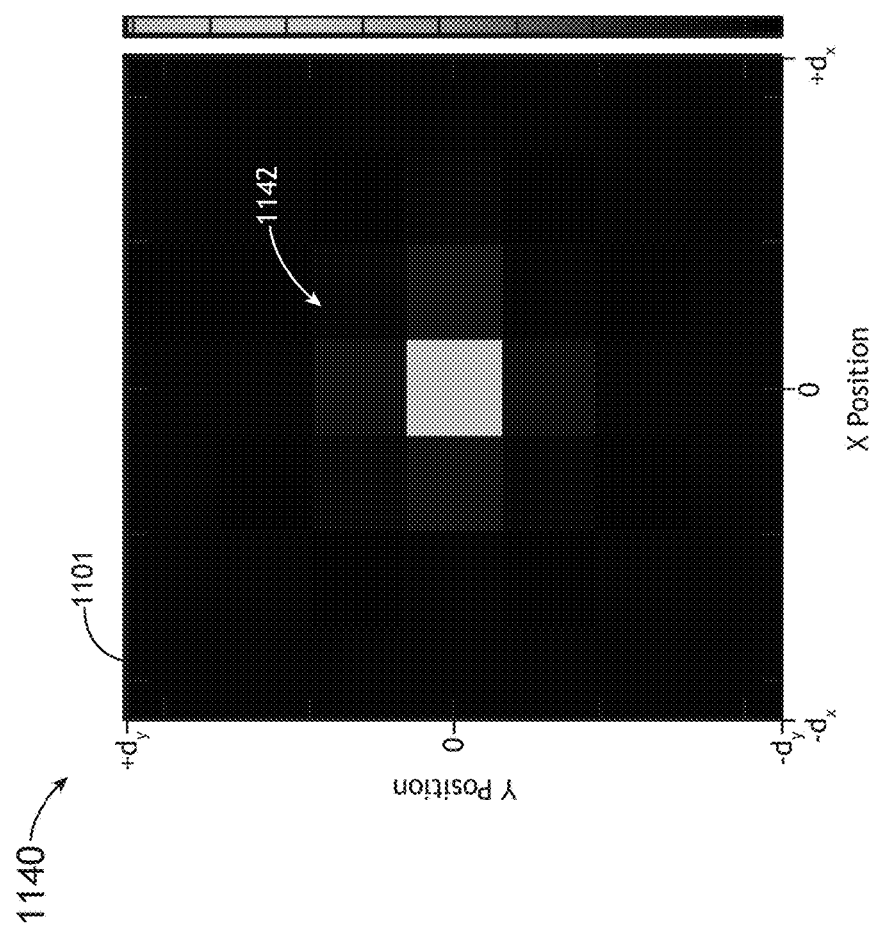
FIG. 11E illustrates graphical data of an observed defect implemented for calibration and testing, in accordance with one or more embodiments of the present disclosure.
Figure 11F:
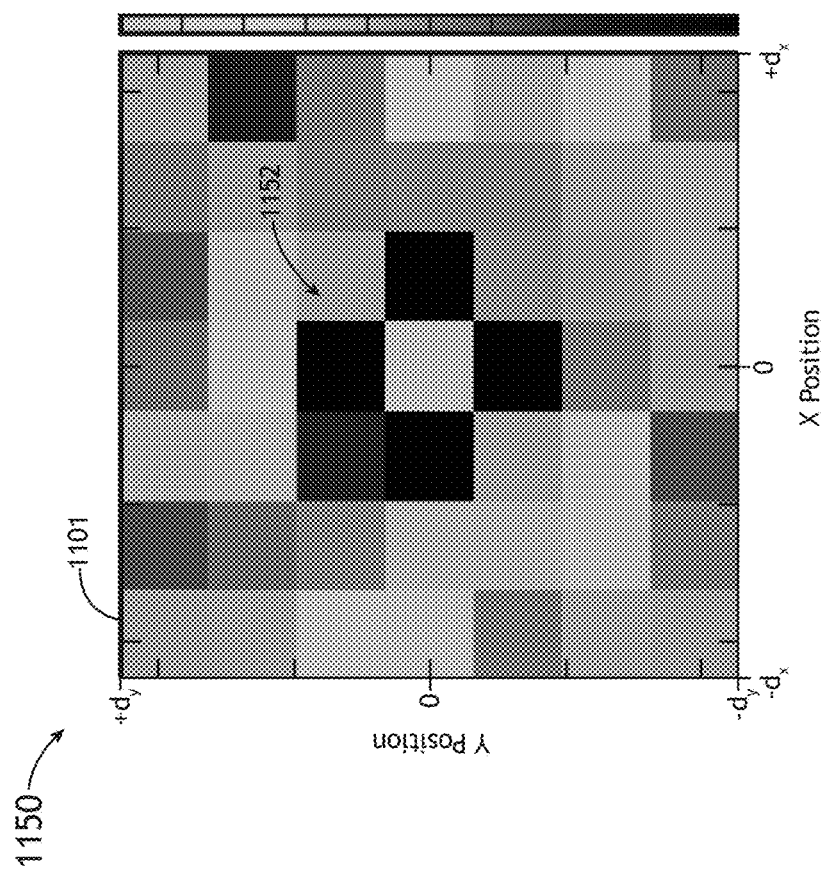
FIG. 11F illustrates graphical data of an observed defect implemented for calibration and testing, in accordance with one or more embodiments of the present disclosure.

FIGS. 11D-11F illustrate graphical data with a pixel 1101 of a cosmic ray event, in accordance with one or more embodiments of the present disclosure. It is noted FIGS. 11D-11F have pixels 1101. FIG. 11D illustrates graphical data 1130 of image data 1132. FIG. 11E illustrates graphical data 1140 of a model 1142 generated with EQ. 5 from the image data 1132. FIG. 11F illustrates graphical data 1150 of the residual value $r^2$ 1152 generated with EQ. 6 from the model 1142.

Figure 11G:
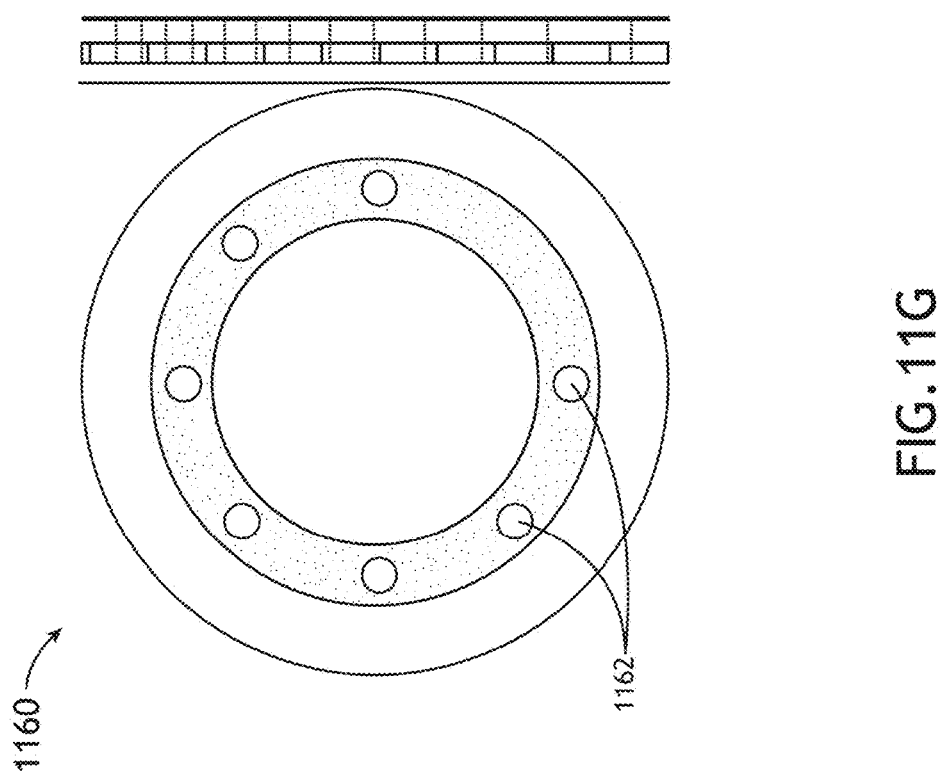
FIG. 11G illustrates a spot deposition wafer used for calibration and testing, in accordance with one or more embodiments of the present disclosure.

FIG. 11G represents a particle deposition wafer 1160 containing one or more particles 1162 of different size. For example, the particle deposition wafer 1160 may be used for calibrating and testing the procedure implementing EQS. 5 and 6 as described above.

Figure 12A:
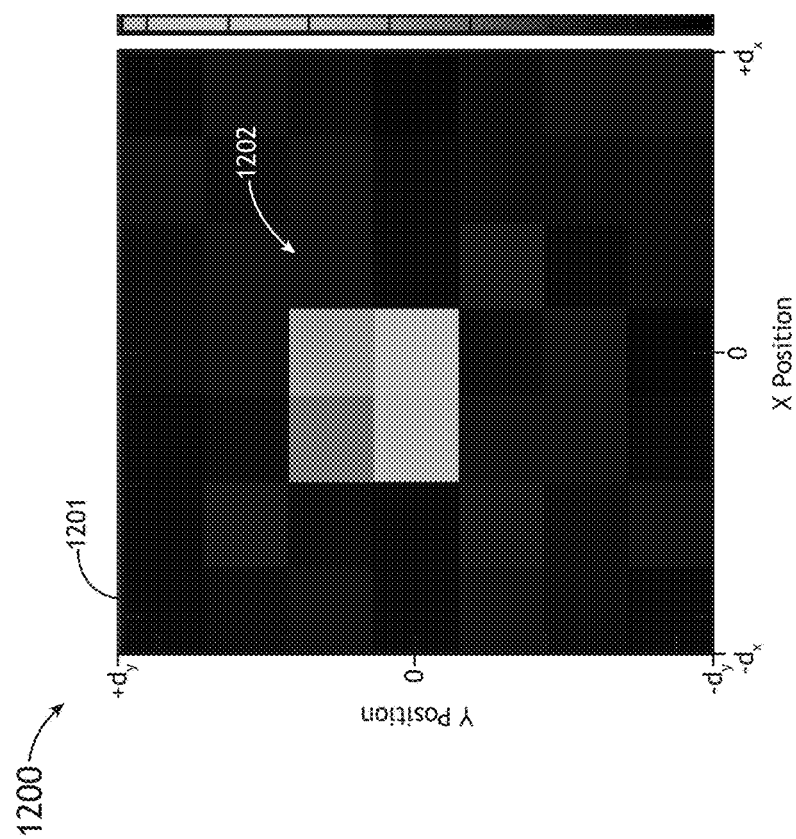
FIG. 12A illustrates graphical data of a defect event, in accordance with one or more embodiments of the present disclosure.
Figure 12B:
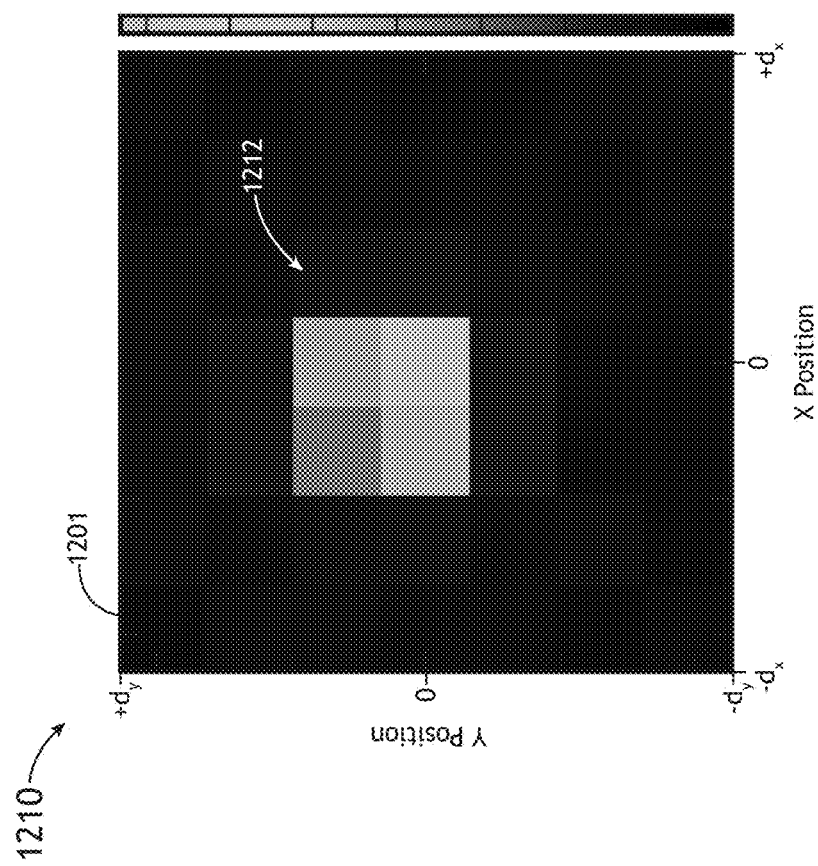
FIG. 12B illustrates graphical data of a defect event, in accordance with one or more embodiments of the present disclosure.
Figure 12C:
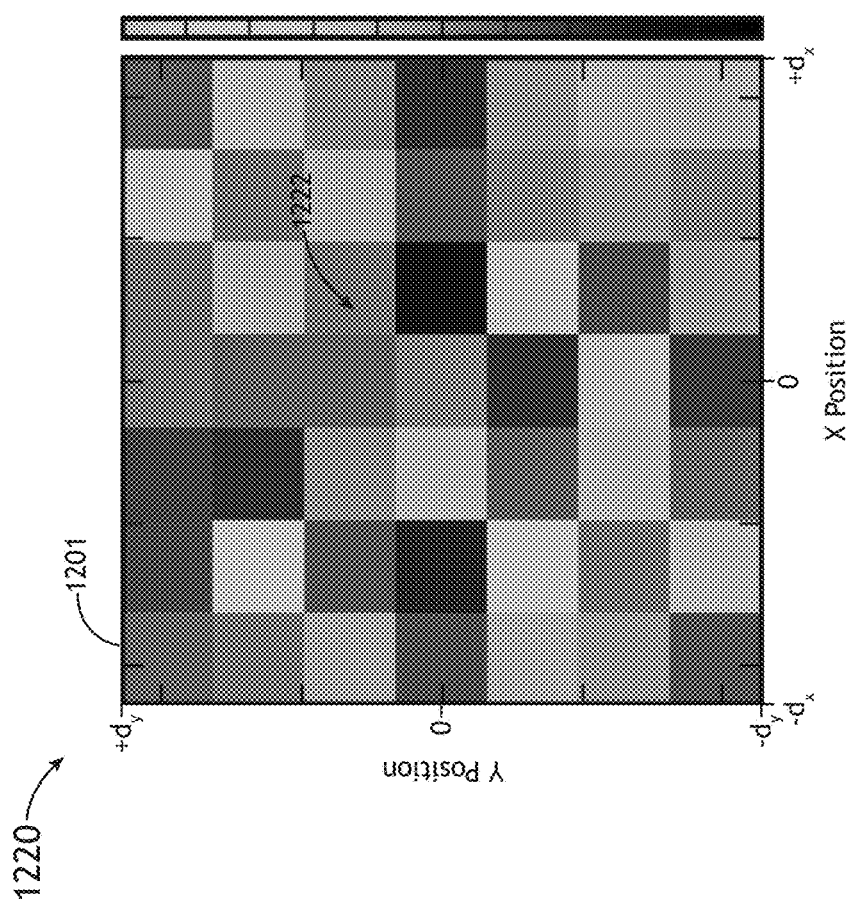
FIG. 12C illustrates graphical data of a defect event, in accordance with one or more embodiments of the present disclosure.

In another embodiment, most events not detected are close to the set threshold value for one or more super resolution procedures. FIGS. 12A-12C illustrate one cosmic ray event in accordance with one or more embodiments of the present disclosure. It is noted herein FIGS. 12A-12C have pixels 1201. FIG. 12A illustrates graphical data 1200 of image data 1202. FIG. 12B illustrates graphical data 1210 of a model 1212 generated with EQ. 5 from the image data 1202. FIG. 12C illustrates graphical data 1220 of the residual value $r^2$ 1222 generated with EQ. 6 from the model 1212.

Figure 13A:
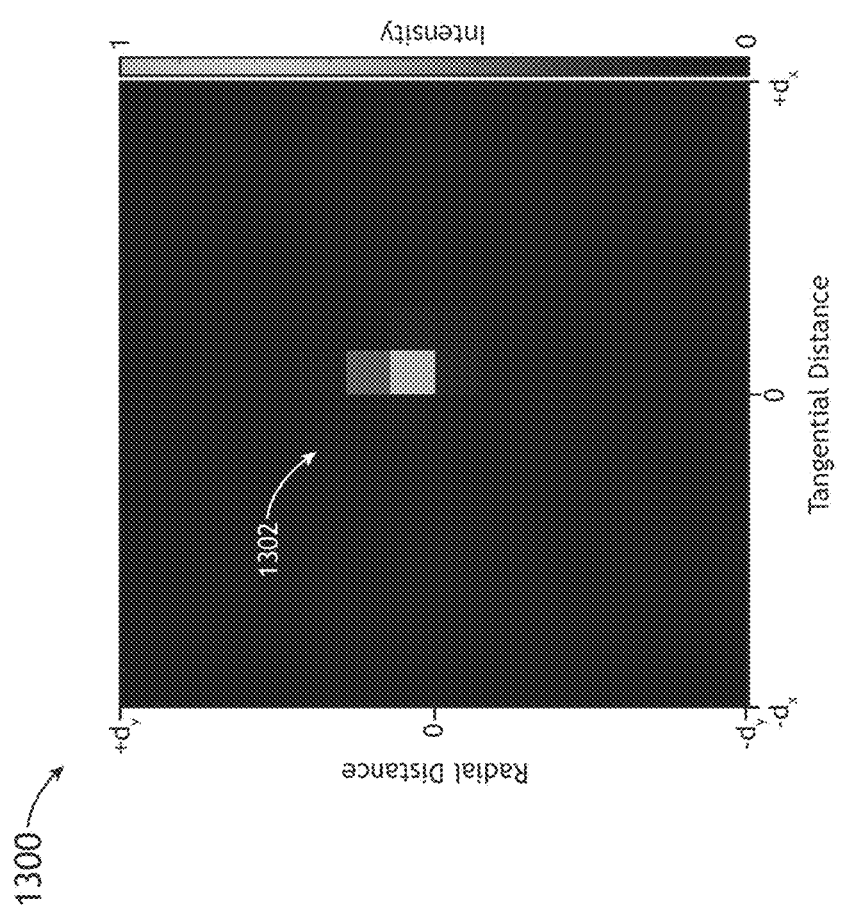
FIG. 13A illustrates graphical data of one or more saturated image pixels, in accordance with one or more embodiments of the present disclosure.
Figure 13B:
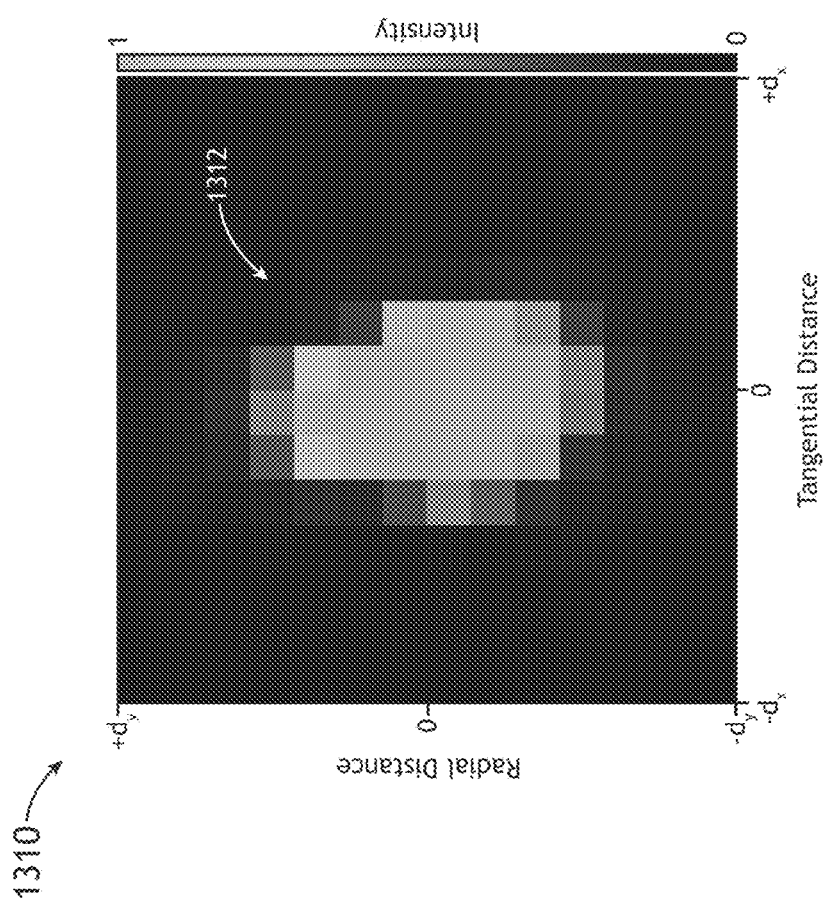
FIG. 13B illustrates graphical data of one or more saturated image pixels, in accordance with one or more embodiments of the present disclosure.

In another embodiment, the reconstructed high-resolution PSF are applicable to extending the dynamic range of a wafer inspection sub-system (e.g, Dynamic Range Extension—DRE). It is noted herein the dynamic range of an inspection sub-system refers to the tool's ability to tell differences in luminosity. In one embodiment, inspection sub-systems report defect sizes in nanometer measurements. For example, the nanometer measurement may be calculated by first taking the total signal and converting the total signal to nanometers using a calibration table. In another embodiment, defects above a certain nanometer size will saturate the sensors of the inspection sub-system 102. FIGS. 13A and 13B illustrate two inspected defects, in accordance with one or more embodiments of the present disclosure. FIG. 13A illustrates graphical data 1300 of a single saturated pixel 1302. FIG. 13B illustrates graphical data 1310 with multiple saturated pixels 1312.

In another embodiment, the application of one or more super resolution processes to DRE includes fitting a PSF to an observed defect using only unsaturated pixels, and converting the amplitude parameter to an equivalent pixel binning size (e.g. 2×2 binning size, 5×5 binning size, 7×7 binning side, and the like).

In another embodiment, one or more PSF tails, or locations in the PSF furthest from the center of the PSF, are measured. For example, measuring the one or more PSF tails may include inspecting a wafer with one or more light point defects (LPDs) that have approximately 1 pixel saturated. By way of another example, measuring the one or more PSF tails may include fitting a calibration PSF to the one or more LPDs. By way of another example, measuring the one or more PSF tails may include normalizing the PSF by amplitude parameter and bin data to a grid.

Figure 14A:
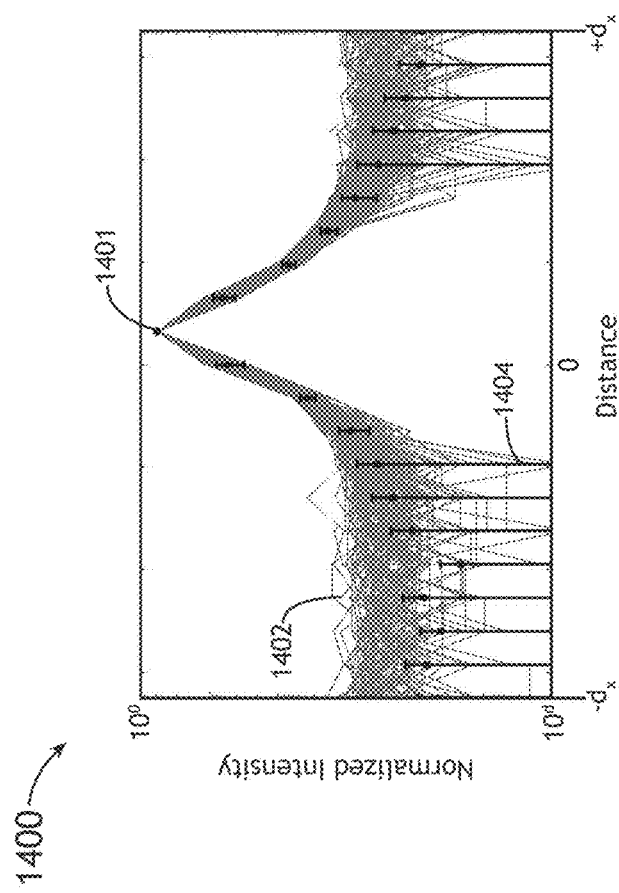
FIG. 14A illustrates graphical data of PSF image tails based on an inspected wafer, in accordance with one or more embodiments of the present disclosure.
Figure 14B:
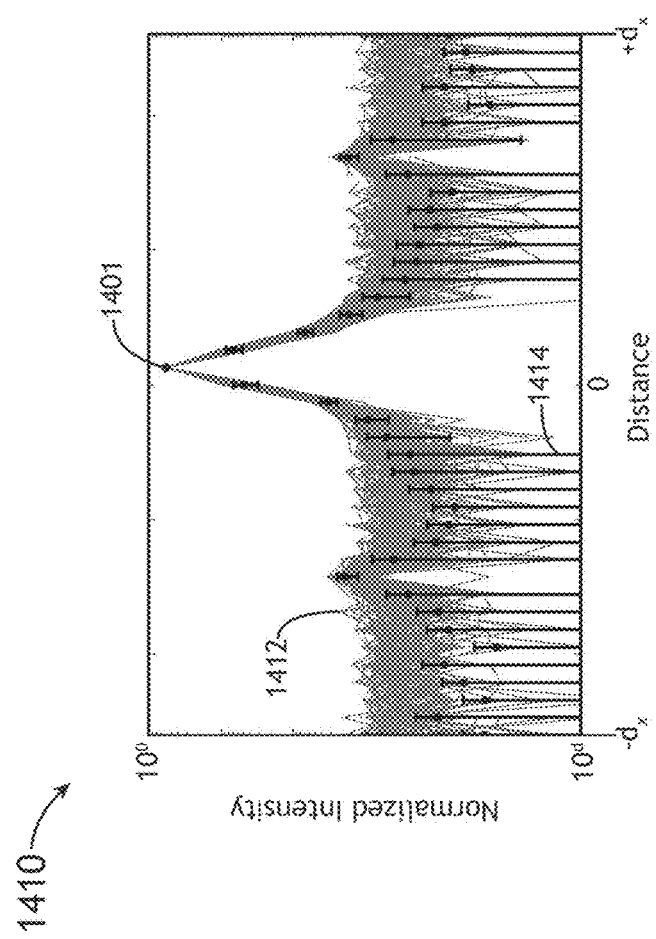
FIG. 14B illustrates graphical data of PSF image tails based on an inspected wafer, in accordance with one or more embodiments of the present disclosure.

FIGS. 14A and 14B illustrate the normalized intensity of PSF tails versus the distance of the PSF tails from the sub-pixel center, in accordance with one or more embodiments of the present disclosure. FIG. 14A illustrates graphical data 1400 for measuring PSF tails around a sub-pixel center 1401 in the tangential direction of the inspection sub-system 102. In one embodiment, gray lines 1402 represent normalized defect signals for defects with centers found to be within a certain selected distance of the sub-pixel center 1401. In another embodiment, black lines 1404 represent max-min-average lines for each defect with centers found to be within the certain selected distance of the sub-pixel center 1401. FIG. 14B illustrates graphical data 1410 for measuring PSF tails around a sub-pixel center 1401 in the radial direction of the inspection sub-system 102. In one embodiment, gray lines 1412 represent normalized defect signals for defects with centers found to be within the certain selected distance of the sub-pixel center 1401. In another embodiment, black lines 1414 represent max-min-average lines for each defect with centers found to be within the certain selected distance of the sub-pixel center 1401.

Figure 15A:
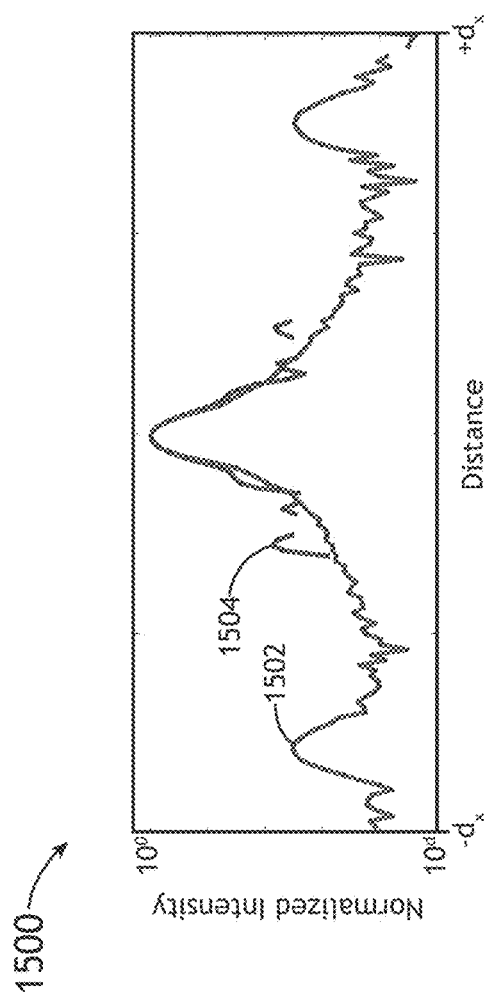
FIG. 15A illustrates graphical data of PSF image tails based on an inspected wafer, in accordance with one or more embodiments of the present disclosure.
Figure 15B:
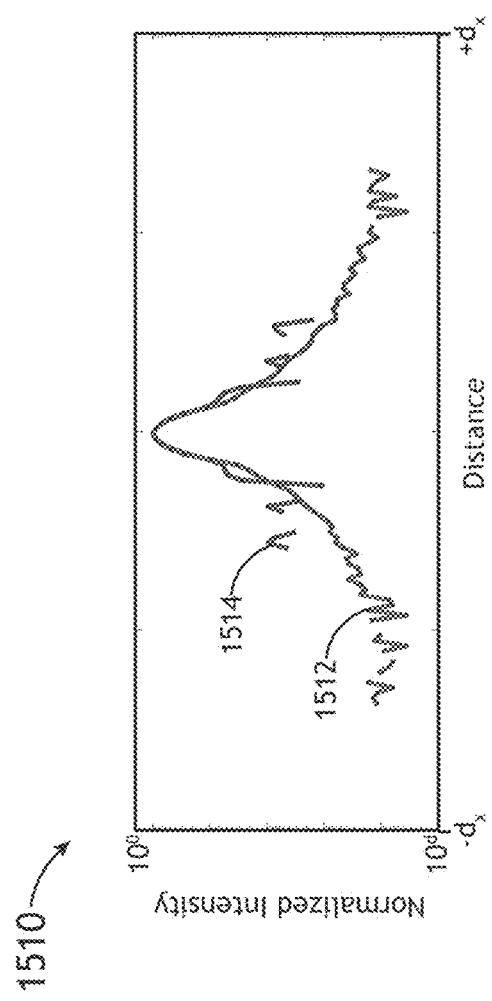
FIG. 15B illustrates graphical data of PSF image tails based on an inspected wafer, in accordance with one or more embodiments of the present disclosure.

FIGS. 15A and 15B illustrate the intensity of PSF tails versus the distance of the PSF tails from the sub-pixel center following the application of super resolution procedures to DRE, in accordance with one or more embodiments of the present disclosure. FIG. 15A illustrates graphical data 1500 of measured PSF tails in the radial direction of the inspection system. In one embodiment, line 1502 represents the high-resolution PSF. In another embodiment, line 1504 represents the high-resolution PSF generated via a procedure that includes fitting a calibrated PSF to one or more LPDs with approximately 1 saturated pixel, as described above. FIG. 15B illustrates graphical data 1510 of measured PSF tails in the tangential direction of the inspection system. In one embodiment, line 1512 represents the high-resolution PSF. In another embodiment, line 1514 represents the high-resolution PSF generated via the procedure that includes fitting a calibrated PSF to one or more LPDs with approximately 1 saturated pixel, as described above.

Figure 15C:
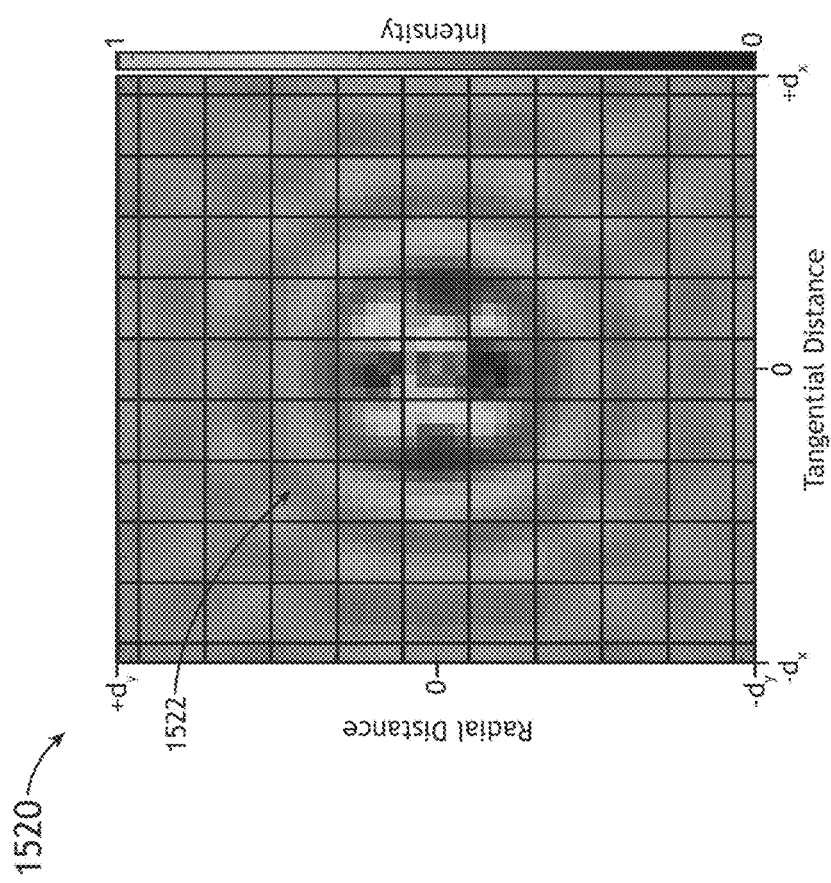
FIG. 15C illustrates graphical data of PSF image tails based on an inspected wafer with light point defects (LPD), in accordance with one or more embodiments of the present disclosure.

FIG. 15C illustrates graphical data 1520 of the difference between PSF tails 1522. As illustrated in FIG. 15C, applying one or more super resolution procedures to DRE results in the removal of ringing in the PSF data.

FIGS. 16A-16D illustrate the results of super resolution procedures tailored to DRE to extend the dynamic range of an inspection system.

Figure 16A:
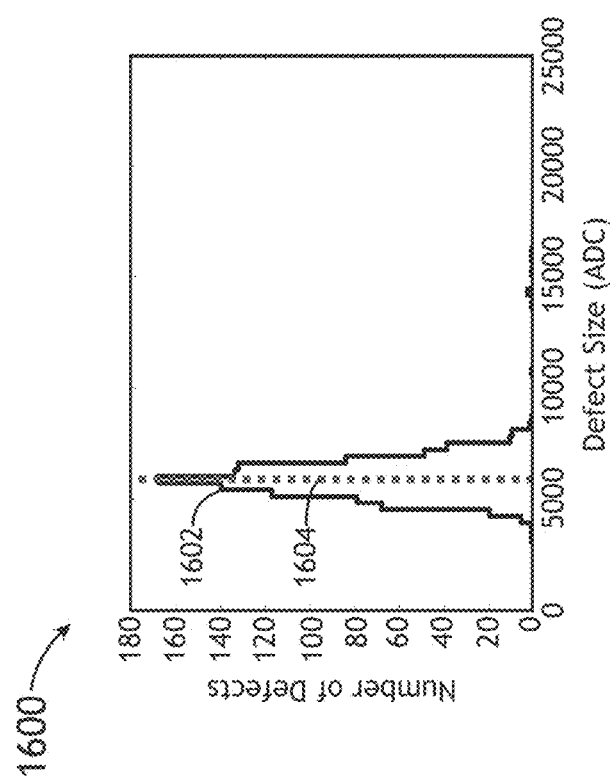
FIG. 16A illustrates graphical data of wafer inspection results, in accordance with one or more embodiments of the present disclosure.
Figure 16B:
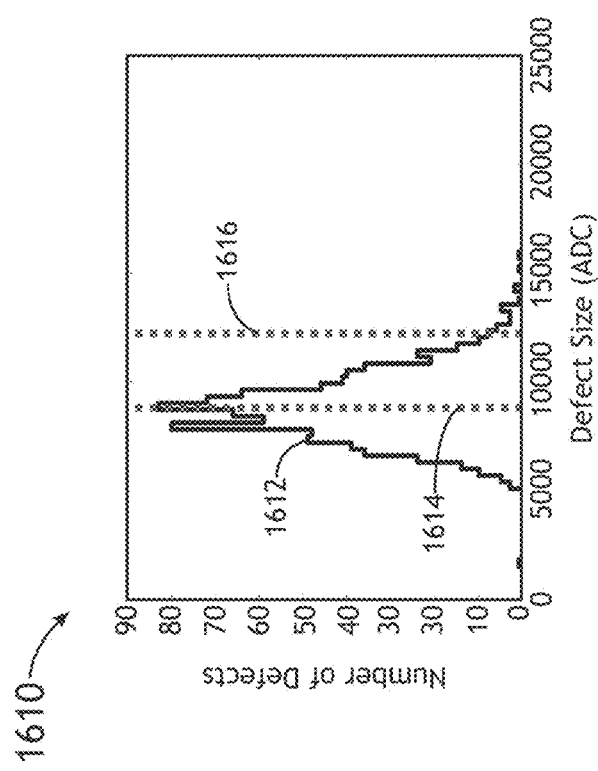
FIG. 16B illustrates graphical data of wafer inspection results, in accordance with one or more embodiments of the present disclosure.
Figure 16C:
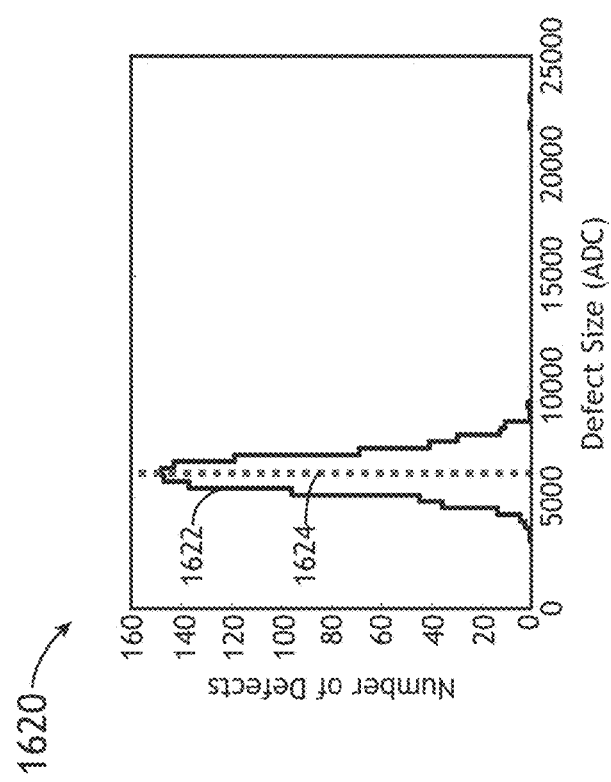
FIG. 16C illustrates graphical data of wafer inspection results, in accordance with one or more embodiments of the present disclosure.
Figure 16D:
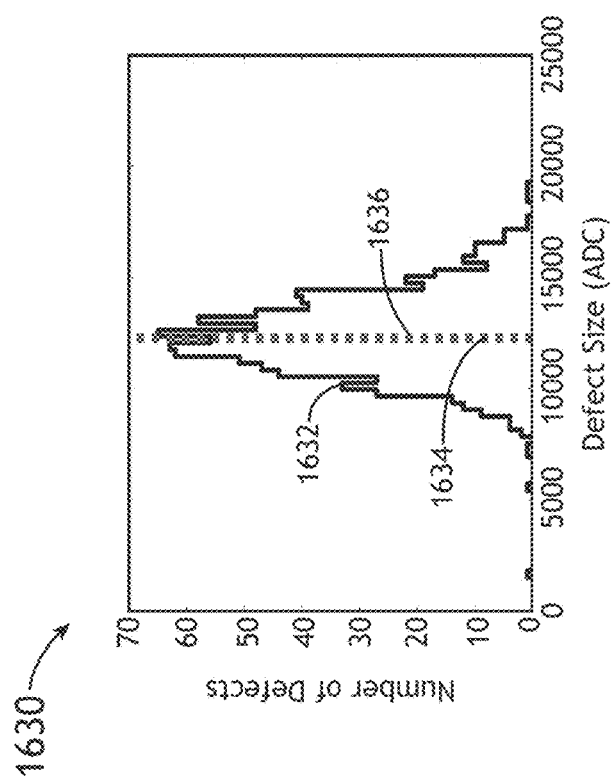
FIG. 16D illustrates graphical data of wafer inspection results, in accordance with one or more embodiments of the present disclosure.

FIG. 16A illustrates graphical data 1600 with defect curve 1602 and peak location 1604 in an unsaturated system not modified with the one or more super resolution procedures applied to DRE. FIG. 16B illustrates graphical data 1610 with defect curve 1612, peak location 1614, and expected peak location 1616 in a saturated system not modified with the one or more super resolution procedures applied to DRE. Here, the expected peak location 1616 is 25% in error from the actual peak 1614. FIG. 16C illustrates graphical data 1620 with defect curve 1622 and peak location 1624 in an unsaturated system modified with the one or more super resolution procedures applied to DRE. FIG. 16D illustrates graphical data 1630 with defect curve 1632, peak location 1634, and expected peak location 1636 in a saturated system modified with the one or more super resolution procedures applied to DRE. Here, the expected peak location 1636 is less than 1% in error from the actual peak 1634.

As illustrated in FIGS. 16A-16D, the defects that saturate the inspection system sensors are correctly sized when the one or more super resolution procedures are applied to DRE, illustrating the use in the re-sizing of large defects.

Although embodiments of the present disclosure are directed to performing one or more advanced applications with the one or more super resolution processes and/or the reconstructed high-resolution PSF, it is noted herein that the one or more advanced applications may be performed with the additional metrics of the optical components for calibration of the inspection sub-system 102. For example, the one or more advanced applications may be performed with the one or more super resolution processes and/or the reconstructed high-resolution PSF, and the additional metrics of the optical components. Therefore, the above description should not be interpreted as a limitation on the present disclosure but merely an illustration.

It is noted herein that all details in FIGS. 2A-16D should be considered as an example of an application of one or more super resolution procedures. Therefore, the above description should not be interpreted as a limitation on the present disclosure but merely an illustration.

FIG. 17 illustrates a process flow diagram depicting a method 1700 of calibrating an inspection system implementing one or more super resolution procedures to reconstruct one or more low-resolution wafer inspection images. It is noted herein that the steps of method 1700 may be implemented all or in part by the system 100. It is further recognized, however, that the method 1700 is not limited to the system 100 in that additional or alternative system-level embodiments may carry out all or part of the steps of method 1700.

In step 1702, one or more low-resolution image patches are acquired. In one embodiment, motion occurs with the inspection sub-system 102 or stage 106. For example, the motion may be random. By way of another example, the motion may be manually applied. In another embodiment, the motion occurs while the inspection sub-system 102 scans one or more images of one or more inspected regions of one or more wafers 104. For each, the images may be captured at a low-resolution. In another embodiment, the motion generates one or more sub-pixel shifts in the one or more low-resolution images. In another embodiment, the low-resolution image patches are portions of one or more images of the wafer 104. In another embodiment, the low-resolution image patches include the one or more sub-pixel shifts. It is noted herein the one or more low-resolution image patches may not be acquired from the inspection sub-system 102, but may instead be previously-stored image patches or acquired from a different inspection sub-system than that in system 100.

In step 1704, the low-resolution image patches are aggregated. In one embodiment, the one or more low-resolution image patches are aggregated by one or more encoders on the inspection sub-system 102 and transmitted to the controller 110. In another embodiment, the low-resolution image patches are received separately and aggregated by one or more encoders in the controller 110.

In step 1706, one or more subpixel shifts are estimated in the low-resolution image patches and, simultaneously, one or more high-resolution PSF are reconstructed. In one embodiment, one or more subpixel shifts are estimated in the low-resolution image patches and, simultaneously, one or more high-resolution PSF are reconstructed with one or more super resolution procedures. In another embodiment, the one or more super resolution procedures include at least a set of linear procedures reliant on the frequency domain of the inspection sub-system.

In an additional step 1708, one or more optical components of the inspection sub-system 102 are selected. In one embodiment, the one or more optical components are selected to calibrate the inspection sub-system 102. In another embodiment, the one or more components of the inspection sub-system 102 are located prior to the sensor. In another embodiment, the one or more optical components are selected by deconvolving the sensor pixel effect, where the sensor pixel effect is the blurring of the one or more images by undersampled or saturated pixels. In another embodiment, the selected one or more optical components have one or more operational parameters. In another embodiment, the one or more operation parameters are compared to optical models. In another embodiment, the one or more operation parameters are used for optical design/ alignment diagnosis.

In an additional step 1710, one or more additional metrics for the inspection system are generated. In one embodiment the reconstructed PSF are one or more metrics of the inspection sub-system 102. In another embodiment, the one or more metrics include one or more additional metrics to calibrate the inspection sub-system 102. In another embodiment, the one or more additional metrics are based on the one or more operational parameters of the one or more selected optical components. For example, the one or more additional metrics may include, but are not limited to, the enclosed energy ratio versus the finite area of the PSF image.

In an additional step 1712, one or more advanced applications are performed. In one embodiment, the advanced applications are performed with the reconstructed high-resolution PSF. In another embodiment, the advanced applications are performed with the reconstructed high-resolution PSF and the additional metrics of the selected optical components of the inspection sub-system 102. In another embodiment, the advanced applications include the reduction of image speckle and shot noise for films based on speckle pattern. In another embodiment, the advanced applications include the rejection of one or more cosmic ray events, differentiating the cosmic ray events from true defects. In another embodiment, the reconstructed high-resolution PSF are applicable to the extension of the dynamic range of a wafer inspection sub-system.

In an additional step, an inspection recipe for the one or more wafers is generated. In one embodiment, the inspection recipe for the one or more wafers is generated based on the one or more high-resolution PSF images. In another embodiment, an inspection recipe for the one or more wafers is generated based on the one or more high-resolution PSF images and the one or more additional calibration metrics.

In an additional step, one or more wafers are inspected for defects with the reconstructed high-resolution PSF and one or more super resolution procedures. In one embodiment, one or more defect inspection images of one or more inspection regions of one or more wafers are received. In one embodiment, the defect inspection images include the same inspection regions as the high-resolution PSF. In another embodiment, the defect inspection images include only a portion of the same inspection regions captured by the reconstructed high-resolution PSF. In another embodiment, the defect inspection images include different inspection regions than those included in the reconstructed high-resolution PSF. In another embodiment, the one or more inspection images are acquired by the inspection sub-system 102. In another embodiment, the one or more defect inspection images include one or more observed defects.

In another embodiment, the defect inspection images and the high-resolution PSF are combined with one or more additional super resolution procedures. In one embodiment, the one or more additional super resolution procedures include at least a non-linear fitting procedure. In another embodiment, the non-linear fitting procedure combines the one or more observed defects in the defect inspection images and the reconstructed high-resolution PSF.

It is noted herein the similarities between the one or more observed defects and the high-resolution PSF differentiate between one or more noises and one or more defects in the defect inspection images. For example, FIGS. 11A and 11B illustrates a similarity between a real defect signal (FIG. 11A) and a high-resolution PSF (FIG. 11B). By way of another example, FIGS. 11D and 11E illustrate a difference between a cosmic ray event (FIG. 11D) and a high-resolution PSF (FIG. 11E).

In an additional step, the inspection recipe is tuned to create a pixel-saturated PSF reconstruction. In one embodiment, the inspection recipe is tuned to create pixel-saturated reconstructed high-resolution PSF to measure one or more PSF tails. In another embodiment, the inspection recipe is tuned to saturate the silica response of the inspection recipe. In another embodiment, the one or more high-resolution images reconstructed without saturation are used to align the pixel-saturated PSF to measure one or more PSF tails.

In an additional step, the one or more super resolution procedures are revised to focus the one or more PSF tail portions of the one or more high-resolution PSF. In one embodiment, the one or more super resolution procedures includes at least the non-linear fitting procedure. In another embodiment, revising the one or more super resolution procedures to focus on the one or more PSF tail portions establishes the total scattering of the one or more defects. In another embodiment, revising the one or more super resolution procedures to focus on the one or more PSF tail portions extends the dynamic range of the inspection sub-system 102.

It is noted herein the results of present disclosure (e.g., the super resolution procedures, the high-resolution PSF, the wafer inspection recipe based on the high-resolution PSF, the results from applying the high-resolution PSF to advanced applications, and the like) may be used by the controller 110 (or another controller, a user, or a remote server) to provide feedback or feedforward information to one or more processing tools of a semiconductor device fabrication line. In this regard, one or more results observed or measured by the system 100 may be used to adjust process conditions at previous stages (feedback) or subsequent stages (feedforward) of the semiconductor device fabrication line.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Although particular embodiments of this disclosure have been illustrated, it is apparent that various modifications and embodiments of the disclosure may be made by those skilled in the art without departing from the scope and spirit of the foregoing disclosure. Accordingly, the scope of the disclosure should be limited only by the claims appended hereto.

What is claimed:

1. A system, comprising:
   an inspection sub-system including one or more imaging sensors configured to detect one or more defects on one or more wafers;
   a stage configured to secure the one or more wafers; and
   a controller communicatively coupled to the one or more imaging sensors of the inspection sub-system, wherein the controller includes one or more processors configured to execute a set of program instructions stored in memory, wherein the program instructions are configured to cause the one or more processors to:
      acquire one or more low-resolution images of a wafer, wherein the one or more low-resolution images include one or more low-resolution image patches, wherein the one or more low-resolution image patches include one or more sub-pixel shifts;
      aggregate the one or more low-resolution image patches; and
      estimate the one or more sub-pixel shifts and simultaneously reconstruct one or more high-resolution point spread functions (PSF) from the aggregated one or more low-resolution image patches and the estimated one or more sub-pixel shifts.

2. The system in claim 1, wherein the one or more sub-pixel shifts are tracked by at least one of:
   one or more stage encoders tracking the radial motion of the stage or one or more stage encoders tracking the translational motion of the stage.

3. The system in claim 1, wherein the one or more sub-pixel shifts include at least one of:
   one or more random sub-pixel shifts, one or more controlled sub-pixel shifts, or one or more reported quantized sub-pixel shifts.

4. The system in claim 1, wherein the one or more low-resolution images of one or more inspected regions of the wafer are aggregated with one or more encoders in the inspection sub-system or with one or more encoders in the controller.

5. The system in claim 1, wherein the program instructions are further configured to cause the one or more processors to:
   reconstruct the one or more high-resolution PSF via one or more super resolution procedures.

6. The system in claim 5, wherein the one or more super resolution procedures include at least a set of linear procedures reliant on the frequency domain of the inspection sub-system.

7. The system in claim 1, wherein the program instructions are further configured to cause the one or more processors to:
perform one or more advanced applications with the one or more reconstructed high-resolution PSF.

8. The system in claim 7, wherein the one or more advanced applications includes reducing image speckle and shot noise for films based on speckle pattern.

9. The system in claim 7, wherein the one or more advanced applications includes rejecting one or more cosmic ray events to differentiate noise from true defects.

10. The system in claim 7, wherein the one or more advanced applications includes extending the dynamic range of the inspection sub-system.

11. The system in claim 1, wherein the program instructions are further configured to cause the one or more processors to:
receive one or more defect inspection images; and
combine the one or more defect inspection images and the reconstructed high-resolution PSF with one or more additional super resolution procedures to differentiate between one or more noises and one or more defects in the one or more defect inspection images.

12. The system in claim 1, wherein the program instructions are further configured to cause the one or more processors to:
generate an inspection recipe for the wafer based on the one or more high-resolution PSF.

13. The system in claim 1, wherein the program instructions are further configured to cause the one or more processors to:
select one or more optical components of the inspection sub-system, wherein the one or more optical components have one or more operational parameters used for at least one of calibration and design of the inspection sub-system;
generate one or more additional calibration metrics for the inspection sub-system, wherein the one or more additional calibration metrics are based on the one or more operational parameters of the one or more optical components; and
generate an inspection recipe for the one or more wafers based on the one or more high-resolution PSF and the one or more additional calibration metrics.

14. A method comprising:
acquiring one or more low-resolution images of a wafer, wherein the one or more low-resolution images include one or more low-resolution image patches, wherein the one or more low-resolution image patches include one or more sub-pixel shifts;
aggregating the one or more low-resolution image patches; and
estimating the one or more sub-pixel shifts and simultaneously reconstructing one or more high-resolution point spread functions (PSF) from the aggregated one or more low-resolution image patches and the estimated one or more sub-pixel shifts.

15. The method in claim 14, wherein the one or more sub-pixel shifts are tracked by at least one of:
one or more stage encoders tracking the radial motion of the stage or one or more stage encoders tracking the translational motion of the stage, wherein the one or more stage encoders are coupled to a stage configured to secure one or more wafers.

16. The method in claim 14, wherein the one or more sub-pixel shifts include at least one of:
one or more random sub-pixel shifts, one or more controlled sub-pixel shifts, or one or more reported quantized sub-pixel shifts.

17. The method in claim 14, wherein the one or more low-resolution images of one or more inspected regions of the wafer are aggregated with one or more encoders in an inspection sub-system or with one or more encoders in a controller.

18. The method in claim 14, further comprising:
reconstructing the one or more high-resolution PSF via one or more super resolution procedures.

19. The method in claim 18, wherein the one or more super resolution procedures include at least a set of linear procedures reliant on the frequency domain of an inspection sub-system.

20. The method in claim 14, further comprising:
performing one or more advanced applications with the one or more reconstructed high-resolution PSF.

21. The method in claim 20, wherein the one or more advanced applications includes reducing image speckle and shot noise for films based on speckle pattern.

22. The method in claim 20, wherein the one or more advanced applications includes rejecting one or more cosmic ray events to differentiate noise from true defects.

23. The method in claim 20, wherein the one or more advanced applications includes extending the dynamic range of the inspection sub-system.

24. The method in claim 14, further comprising:
receiving one or more defect inspection images; and
combining the one or more defect inspection images and the reconstructed high-resolution PSF with one or more additional super resolution procedures to differentiate between one or more noises and one or more defects in the one or more defect inspection images.

25. The method in claim 14, further comprising:
generating an inspection recipe for the wafer based on the one or more high-resolution PSF.

26. The method in claim 14, further comprising:
selecting one or more optical components of an inspection sub-system, wherein the one or more optical components have one or more operational parameters used for at least one of calibration and design of the inspection sub-system;
generating one or more additional calibration metrics for the inspection sub-system, wherein the one or more additional calibration metrics are based on the one or more operational parameters of the one or more optical components; and
generating an inspection recipe for the wafer based on the one or more high-resolution PSF and the one or more additional calibration metrics.

* * * * *